US012298539B2

United States Patent
Liu et al.

(10) Patent No.: US 12,298,539 B2
(45) Date of Patent: May 13, 2025

(54) CURVED DISPLAY WITH LIGHT CONTROL FILM

(71) Applicant: 3M INNOVATIVE PROPERTIES COMPANY, St. Paul, MN (US)

(72) Inventors: Tao Liu, Woodbury, MN (US); Gary T. Boyd, Woodbury, MN (US); Tri D. Pham, Woodbury, MN (US); Garth V. Antila, Hudson, WI (US); Keith R. Jacobs, Blaine, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 663 days.

(21) Appl. No.: 17/596,633

(22) PCT Filed: Jun. 11, 2020

(86) PCT No.: PCT/IB2020/055503
§ 371 (c)(1),
(2) Date: Dec. 15, 2021

(87) PCT Pub. No.: WO2020/261027
PCT Pub. Date: Dec. 30, 2020

(65) Prior Publication Data
US 2022/0163704 A1 May 26, 2022

Related U.S. Application Data

(60) Provisional application No. 62/865,510, filed on Jun. 24, 2019.

(51) Int. Cl.
*G02B 5/00* (2006.01)
(52) U.S. Cl.
CPC .................................. *G02B 5/003* (2013.01)

(58) Field of Classification Search
None
See application file for complete search history.

(56) References Cited

U.S. PATENT DOCUMENTS

| 2,122,135 A | 6/1938 | Freeman |
| RE27,617 E | 4/1973 | Olsen |

(Continued)

FOREIGN PATENT DOCUMENTS

| CN | 109239830 A * | 1/2019 | ........... G02B 5/0242 |
| JP | 2007256964 A * | 10/2007 | |

(Continued)

OTHER PUBLICATIONS

International Search Report for PCT International Application No. PCT/IB2020/055503, mailed on Aug. 25, 2020, 3 pages.

*Primary Examiner* — Bao-Luan Q Le
*Assistant Examiner* — Danell L Owens
(74) *Attorney, Agent, or Firm* — Clifton F. Richardson

(57) ABSTRACT

A curved display includes a display panel having a curved major surface and a light control film disposed proximate the display panel. The curved major surface is curved about a first axis, and a central portion of the curved major surface has a surface normal along a second axis substantially orthogonal to the first axis. The light control film includes a major surface having a substantially same shape as the curved major surface and includes a plurality of alternating optically transmissive and optically absorptive regions. In a cross-section orthogonal to the first axis, a transmissive region and adjacent absorptive regions define a central ray transmission direction through the optically transmissive region such that a light ray emitted by the display panel and transmitted through the optically transmissive region along (Continued)

the transmission direction is refracted upon exiting the curved display into a direction substantially parallel to the second axis.

15 Claims, 18 Drawing Sheets

(56) References Cited

U.S. PATENT DOCUMENTS

| | | | |
|---|---|---|---|
| 3,919,559 | A | 11/1975 | Stevens |
| 3,972,593 | A | 8/1976 | Appeldorn |
| 5,254,388 | A | 10/1993 | Melby |
| 8,012,567 | B2 | 9/2011 | Gaides |
| 8,213,082 | B2 | 7/2012 | Gaides |
| 8,503,122 | B2 | 8/2013 | Liu |
| 8,659,829 | B2 | 2/2014 | Walker, Jr. |
| 8,780,300 | B2 | 7/2014 | Niioka |
| 9,644,816 | B1 | 5/2017 | Barnidge |
| 2003/0210535 | A1 | 11/2003 | Gaides |
| 2012/0064296 | A1 | 3/2012 | Walker, Jr. |
| 2016/0097895 | A1 | 4/2016 | Wolk |
| 2016/0368019 | A1 | 12/2016 | Wolk |

FOREIGN PATENT DOCUMENTS

| | | |
|---|---|---|
| JP | 2009031322 | 2/2009 |
| JP | 2011095719 A | 5/2011 |
| JP | 2013213884 | 10/2013 |
| JP | 2015075535 | 4/2015 |
| JP | 2015219270 | 12/2015 |
| JP | 2016038432 A | 3/2016 |
| JP | 5970920 | 8/2016 |
| JP | 2018151425 A | 9/2018 |
| JP | 2019045842 | 3/2019 |
| WO | WO 2018-097841 | 5/2018 |
| WO | WO 2018-129073 | 7/2018 |
| WO | WO 2018-225714 | 12/2018 |
| WO | WO 2019-044847 | 3/2019 |

* cited by examiner

CURVED DISPLAY WITH LIGHT CONTROL FILM

CROSS REFERENCE TO RELATED APPLICATIONS

This application is a national stage filing under 35 U.S.C. 371 of PCT/IB2020/055503, filed Jun. 11, 2020, which claims the benefit of U.S. Provisional Application No. 62/865,510 filed Jun. 24, 2019, the disclosures of which are incorporated by reference in their entirety herein.

BACKGROUND

A light control film may be configured to regulate the directionality of light transmitted through the light control film.

A display may be curved to provide a wider field of view and to improve an immersive experience for a viewer.

SUMMARY

In some aspects of the present description, a curved display including a display panel and a light control film disposed proximate the display panel is provided. The display panel includes a curved major surface that is curved about a first axis. A central portion of the curved major surface has a surface normal along a second axis substantially orthogonal to the first axis. The light control film includes a first major surface having a substantially same shape as the curved major surface of the display panel. The light control film includes a plurality of alternating optically transmissive and optically absorptive regions extending along a longitudinal direction parallel to the first axis and arranged along a direction orthogonal to the first and second axes such that the plurality of alternating optically transmissive and optically absorptive regions is substantially coextensive with the first major surface. The optically transmissive regions have a refractive index greater than 1.2. In a cross-section orthogonal to the first axis and for each optically transmissive region in at least a majority of the optically transmissive regions in the plurality of alternating optically transmissive and optically absorptive regions, the optically transmissive region and adjacent optically absorptive regions define a central ray transmission direction through the optically transmissive region such that a light ray emitted by the display panel and transmitted through the optically transmissive region along the central ray transmission direction is refracted upon exiting the curved display into a direction substantially parallel to the second axis.

In some aspects of the present description, a curved display including a display panel and a light control film disposed proximate the display panel is provided. The display panel includes a curved major surface that is curved about a first axis and that has a surface normal along a second axis substantially orthogonal to the first axis in a central portion of the curved major surface and making an angle γ of at least 15 degrees with the second axis in an edge portion of the curved major surface. The light control film disposed includes a first major surface having a substantially same shape as the curved major surface of the display panel. The light control film includes a plurality of alternating optically transmissive and optically absorptive regions extending along a longitudinal direction parallel to the first axis and arranged along a direction orthogonal to the first and second axes. In a cross-section orthogonal to the first axis, each optically transmissive region and adjacent optically absorptive regions in the plurality of alternating optically transmissive and optically absorptive regions define a central ray transmission direction making an angle φ with the surface normal of the curved major surface and an angle α with the second axis, each of the angles φ and α increasing from less than 5 degrees in a central region of the light control film to at least 10 degrees in an edge region of the light control film.

In some embodiments, a method of making a light control film for a display panel having a curved major surface is provided. The method includes determining a shape of the curved major surface of the display panel; providing a multilayer stack comprising a plurality of alternating optically transmissive and optically absorptive layers; and cutting the light control film from the multilayer stack along at least opposing major curved surfaces of the light control film. For each of the curved surfaces, at least a majority of the curved surface is intermediate between first and second surfaces, the first surface having the shape of the curved major surface of the display panel, the second surface being a plane tangent to the first surface.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A curved display of the present description includes a display panel having a curved major surface (also referred to as a display surface) and a light control film (also referred to as a louver film) disposed proximate the display panel. The light control film includes a plurality of alternating optically transmissive and optically absorptive regions. The absorptive regions may be or include louvers. The louvers typically have a distribution of orientation such that for some regions of the light control film (e.g., all of the film except for a central region), the louvers are neither normal to the display surface nor parallel to an axis that normal to the display surface at a predetermined location (e.g., a center) of the display surface. The tilt of the louvers may be selected to have a predetermined distribution, which may be selected based, at least in part, on the geometry of the curved display, such that the light output of the curved display has a desired directionality or angular distribution. For example, the desired light output distribution may be such that a central light ray passing through a transmissive region between adjacent louvers is refracted upon exiting the curved display into a direction parallel to an axis normal to the display surface at a center of the display surface. The light control films describe herein have been found to provide desired performance, including desired off-axis blocking, without resulting in bright band issues that arise in other approaches (e.g., approaches that utilize lenses with conventional louver films).

Figure 1:
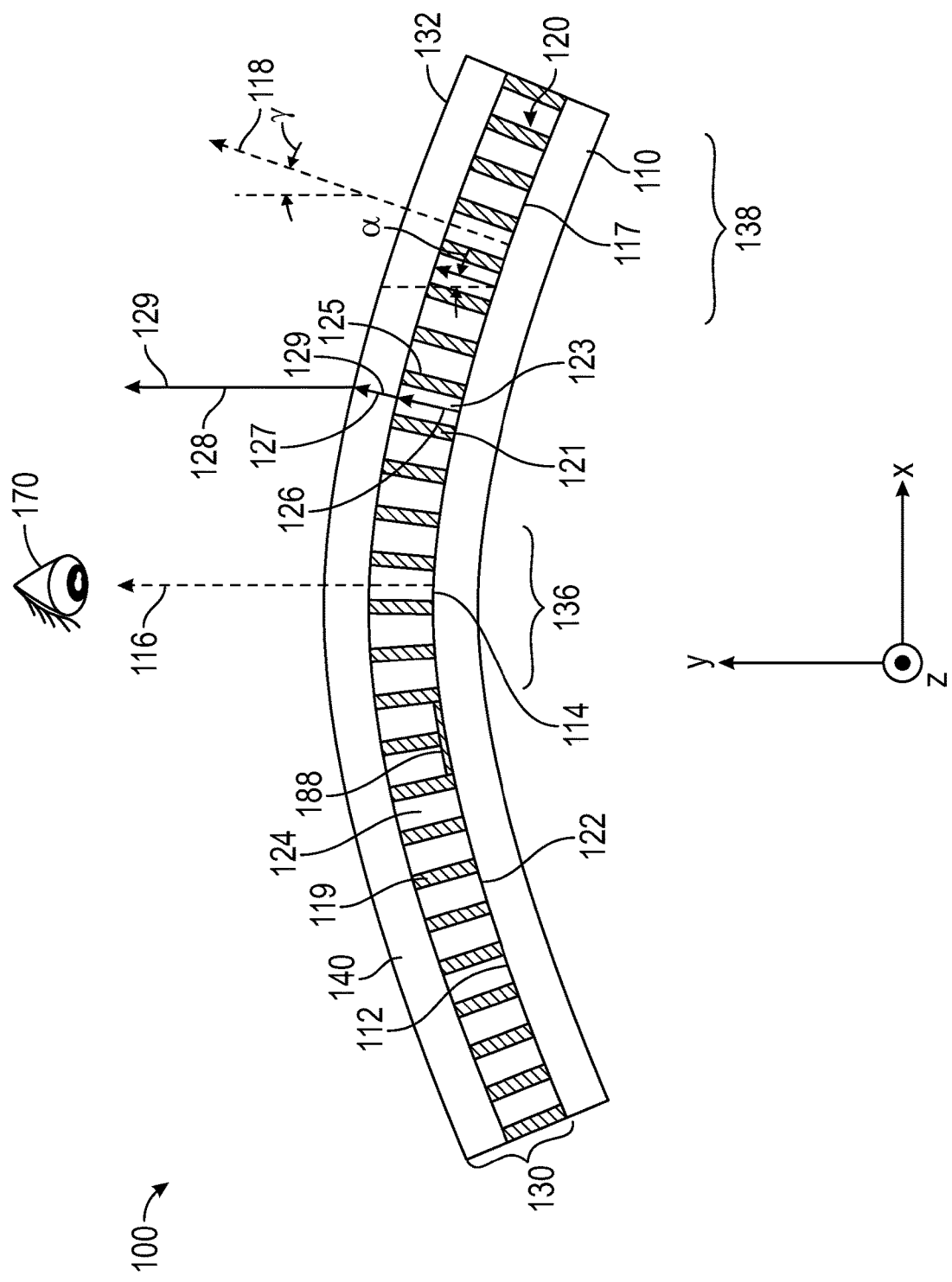
FIGS. 1-2 are schematic cross-sectional views of curved displays.

FIG. 1 is a schematic cross-sectional view of a curved display including a display panel 110 and a light control film 120 disposed proximate the display panel 110. The display panel 110 has a curved major surface 112 which is curved about a first axis (z-axis). A central portion 114 of the curved major surface 112 has a surface normal 116 along a second axis (y-axis) substantially orthogonal (e.g., within 20 degrees, or 10 degrees, or 5 degrees of orthogonal) to the first axis. The light control film 120 has a first major surface 122 having a substantially same shape as the curved major surface 112 of the display panel 110. For example, the first major surface 122 and the curved major surface 112 may have a shape such that the surfaces can displaced from one another by a layer (e.g., an adhesive layer) having a substantially constant thickness (e.g., a thickness varying by less than 20 percent or less than 10 percent). The light control film 120 includes a plurality of alternating optically transmissive and optically absorptive regions 124 and 119 extending along a longitudinal direction (z-direction) parallel to the first axis and arranged along a direction (x-direction) orthogonal to the first and second axes. The optically transmissive regions 124 may have an average optical transmittance (e.g., of light normally incident on the light control film in a wavelength range of 400 to 700 nm) of at least 60 percent, or at least 70 percent, or at least 80%. The optically absorptive regions 119 may have an average optical absorbance (e.g., of light normally incident on the light control film) in a wavelength range of 400 to 700 nm) of at least 50 percent, or at least 60 percent, or at least 70 percent.

In some embodiments, in a cross-section (x-y plane) orthogonal to the first axis and for each optically transmissive region 123 in at least a majority of the optically transmissive regions (e.g., at least 70%, 80%, 90%, or 95% of the optically transmissive regions, or all of the optically transmissive regions, or all of the optically transmissive regions except possibly for transmissive regions near lateral edges of the light control film 120) in the plurality of alternating optically transmissive and optically absorptive regions, the optically transmissive region 123 and adjacent optically absorptive regions 121 and 125 define a central ray transmission direction 126 through the optically transmissive region such that a light ray 129 emitted by the display panel and transmitted through the optically transmissive region 123 along the central ray transmission direction 126 is refracted upon exiting the curved display into a direction 128 substantially parallel (e.g., within 10 degrees or within 5 degrees of parallel) to the second axis. In some embodiments, a louvered element 130 includes the light control film and an optional additional element 140 as described further elsewhere. In the illustrated embodiment, the light ray 129 propagates along direction 127 in the additional element 140 and is refracted into direction 128 upon exiting the additional element 140 through major surface 132 which is an outer surface of the curved display 100.

The central ray transmission direction 126 is a direction of a central ray propagating though the optically transmissive region 123 and is generally along a centerline between the absorptive regions 121 and 125. It will be understood that light can be transmitted through the optically transmissive region 123 in a range of propagation directions around the central ray transmission direction 126.

In some embodiments, the curved major surface 112 has a surface normal 118 being along a second axis (y-axis) substantially orthogonal to the first axis in a central portion 114 of the curved major surface 112 and making an angle γ of at least 15 degrees, or at least 20 degrees, or at least 25 degrees with the second axis in an edge portion 117 of the curved major surface 112. In some embodiments, in a cross-section (x-y plane) orthogonal to the first axis, each optically transmissive region and adjacent optically absorptive regions in the plurality of alternating optically transmissive and optically absorptive regions define a central ray transmission direction making an angle α with the second axis, where the angle α increases from less than 5 degrees in a central region 136 of the light control film 120 to at least 10 degrees in an edge region 138 of the light control film 120. In some embodiments, the angle α increases from less than 3 degrees in the central region 136 of the light control film 120 to at least 15 degrees, or to at least 20 degrees, in the edge region 138 of the light control film 120. As described further elsewhere (see, e.g., FIGS. 3-4), in some embodiments, in a cross-section (x-y plane) orthogonal to the first axis, each optically transmissive region and adjacent optically absorptive regions in the plurality of alternating optically transmissive and optically absorptive regions define a central ray transmission direction making an angle φ with the surface normal of the curved major surface 112. In some embodiments, the angle φ increases from less than 5 degrees in the central region 136 of the light control film 120 to at least 10 degrees in the edge region 138 of the light control film 120. In some embodiments, the angle φ increases from less than 3 degrees in the central region 136 of the light control film 120 to at least 15 degrees, or to at least 20 degrees, in the edge region 138 of the light control film 120.

The central portion 114 of the curved major surface 112 is a portion of the curved major surface 112 substantially closer to a center of the curved major surface 112 than to a closest lateral edge of the curved major surface (e.g., a distance to the center in the cross-section orthogonal to the first axis may be less than half a distance to the closest lateral edge in the cross-section). The edge portion 117 of the curved major surface 112 is a portion of the curved major surface 112 substantially closer to a lateral edge of the curved major surface 112 than to the center of the curved major surface 112 (e.g., a distance to the lateral edge in the cross-section orthogonal to the first axis may be less than half a distance to the center in the cross-section). Similarly, the central region 136 of the light control film 120 is a region of the light control film substantially closer to a center of the light control film than to the closest lateral edge of the light control film 120, and the edge region 138 of the light control film 120 is a region of the light control film 120 substantially closer to a lateral edge of the light control film 120 than to the center of the light control film 120. The central and edge portions or regions may have a width correspond to a width of one or more pairs of optically transmissive and optically absorptive regions (e.g., 1-10 pairs).

In some embodiments, the plurality of alternating optically transmissive and optically absorptive regions have a pitch (e.g., center to center distance between adjacent optically absorptive regions) less than 0.1 mm, or less than 0.07 mm, for example. The pitch may be greater than 0.005 mm, for example.

In some embodiments, the plurality of alternating optically transmissive and optically absorptive regions 124 and 119 is substantially coextensive with the first major surface 122. For example, the plurality of alternating optically transmissive and optically absorptive regions 1124 and 119 may extend across at least 70%, 80%, 90%, or 95% of the total area of the major surface 122. Similarly, in some embodiments, the plurality of alternating optically transmissive and optically absorptive regions 124 and 119 extends across at least 70%, 80%, 90%, or 95% of a total area the curved major surface 112. In some embodiments, the plurality of alternating optically transmissive and optically absorptive regions 124 and 119 extends entirely across a length and width of the first major surface 122 or of the curved major surface 112.

In the embodiment illustrated in FIG. 1, the curved major surface 112 is a light output surface of the display panel 110 and the light control film 120 is disposed to receive light from the light output surface. In other embodiments, the display panel may be a transmissive display panel and the curved major surface of the display panel may be a light input surface of the display panel where the light control film is disposed to transmit light to the light input surface. This is schematically illustrated in FIG. 2.

Figure 2:
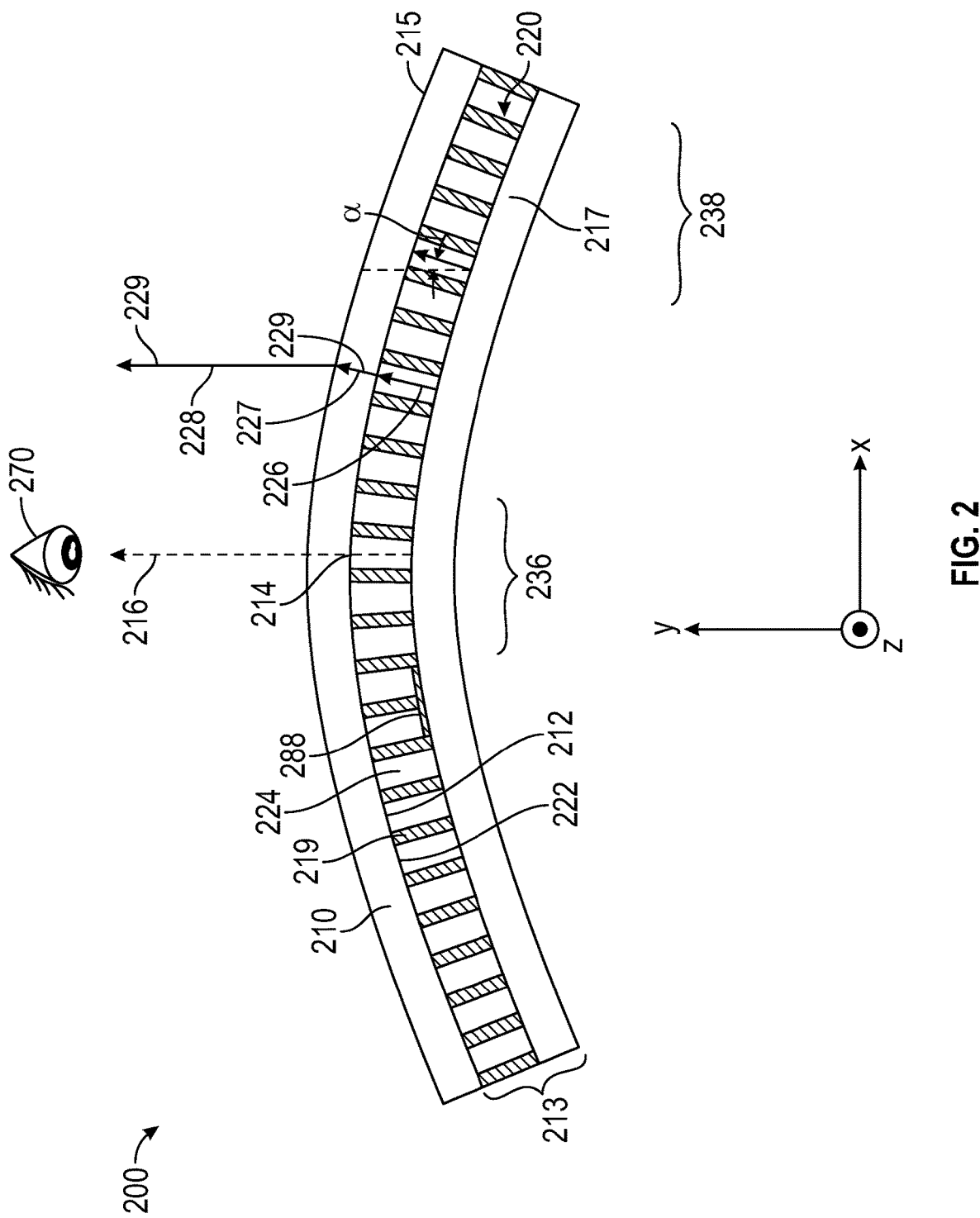

FIG. 2 is a schematic cross-sectional view of a curved display 200 including a display panel 210 and a light control film 220 disposed proximate the display panel 210. The display panel 210 has a curved major surface 212 which is curved about a first axis (z-axis). A central portion 214 of the curved major surface 212 has a surface normal 216 along a second axis (y-axis) substantially orthogonal to the first axis. The curved major surface 212 is a light input surface of the display panel 210. The display panel 210 has an output curved major surface 215 opposite the curved major surface 212. The light control film 220 has a first major surface 222 having a substantially same shape as the curved major surface 212 of the display panel 210. The light control film 220 may correspond to light control film 120 and may include a plurality of alternating optically transmissive and optically absorptive regions 224 and 219 as described for regions 124 and 119, respectively. In some embodiments, in a cross-section (x-y plane) orthogonal to the first axis and for each optically transmissive region in at least a majority of the optically transmissive regions in the plurality of alternating optically transmissive and optically absorptive regions, the optically transmissive region and adjacent optically absorptive regions define a central ray transmission direction 226 through the optically transmissive region such that a light ray 229 emitted by the display panel and transmitted through the optically transmissive region along the central ray transmission direction 226 is refracted upon exiting the curved display into a direction 228 substantially parallel to the second axis. In the illustrated embodiment, the light ray 229 propagates along direction 227 in the display panel 210 and is refracted into direction 128 upon exiting the display panel 210 through major surface 215 which is an outer surface of the curved display 200.

The curved display 200 includes a backlight 213 disposed to illuminate the display panel 210. The backlight 213 includes the light control film 220. In the illustrated embodiment, the backlight 213 further includes a backlighting element 217 disposed to illuminate the light control film 220. Alternatively, in some embodiments, the backlighting element 217 may be considered to be a backlight and the light control film 220 can be described as being disposed between the backlight and the display panel 210.

In some embodiments, the first major surface of the light control film is disposed on (e.g., directly or indirectly through an adhesive layer), and conforms to, the curved major surface of the display panel. For example, the light control film 120 may be disposed on and may conform to the curved major surface 112 of the display panel 110. As another example, the light control film 220 may be disposed on and may conform to the curved major surface 212 of the display panel 210.

The angle α between the second axis and the central ray transmission direction may vary between central and edge regions 236 and 238 of the light control film 220 as described for curved display 100. An angle φ (see, e.g., FIGS. 3-4) between the surface normal of the curved major surface 212 central ray transmission direction may vary between central and edge regions 236 and 238 of the light control film 220 as described for curved display 100.

For any of the light control films described herein, the optically transmissive regions may have a refractive index n1 greater than 1.2, or greater than 1.3, or greater than 1.4, for example. In some embodiments, the refractive index n1 is less than 1.9, or less than 1.8, for example. In some embodiments, the optically absorptive regions have a refractive index n2 where $-0.005 \leq n2-n1 \leq 0.02$ or $-0.005 \leq n2-n1 \leq 0.005$. Using materials having such small refractive index differences can reduce ghosting as described in U.S. Pat. No. 8,213,082 (Gaides et al.) and U.S. Pat. No. 8,503,122 (Liu et al.), for example. The refractive index refers to the real part of the index of refraction determined at a wavelength of 532 nm, unless indicated differently.

Suitable materials for the transmissive and absorptive regions include polymerizable resins such as acrylates or methacrylates. The absorptive regions can further include a black colorant such as carbon black, for example. Suitable low refractive index materials include nanovoided materials such as those described in U.S. Pat. Appl. Publ. No. 2016/0368019 (Wolk et al.) and 2016/0097895 (Wolk et al.), for example. Suitable high index materials include polymeric materials including nanoparticles (e.g., inorganic nanoparticles) to increase the refractive index. Other useful materials for the light control film are described in U.S. Pat. No. 8,012,567 (Gaides et al.), U.S. Pat. No. 8,213,082 (Gaides et al.), and U.S. Pat. No. 8,659,829 (Walker, Jr. et al.), for example.

Figure 3:
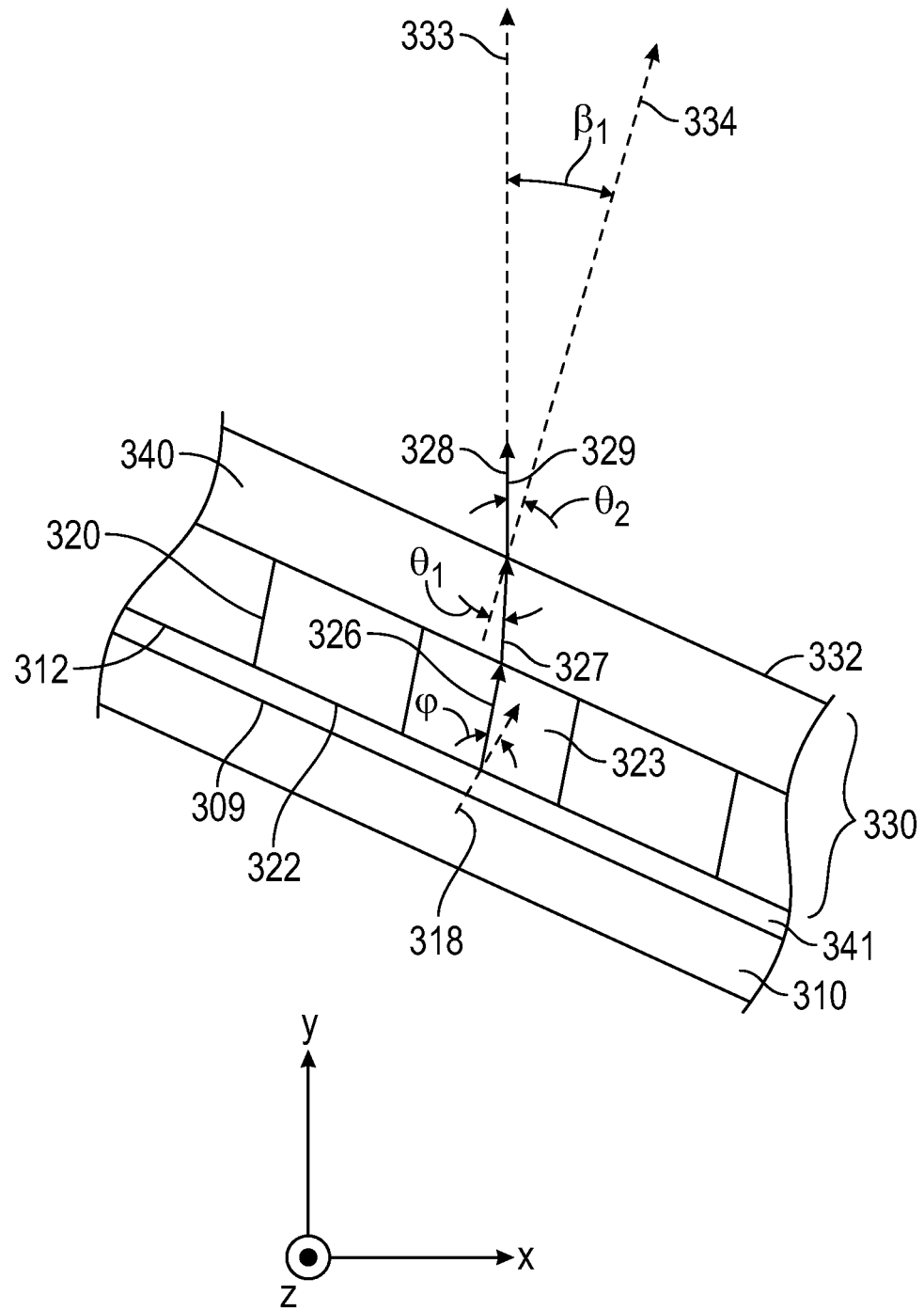
FIGS. 3-4 are schematic cross-sectional views of portions of curved displays.

FIG. 3 is a schematic cross-sectional view of a portion of a curved display including a display panel 310 and a light control film 320 disposed proximate the display panel 310. The curvature of the display is not shown for the portion schematically illustrated in FIG. 3 since the radius of curvature is large compared to the size of the portion shown in this case. The display panel 310 and light control film 320 may be as described for display panel 110 and light control film 120, respectively, for example. The light control film 320 includes a plurality of alternating optically transmissive and optically absorptive regions as described elsewhere. In some embodiments, in a cross-section (x-y plane) orthogonal to the first axis, each optically transmissive region 323 and adjacent optically absorptive regions in the plurality of alternating optically transmissive and optically absorptive regions define a central ray transmission direction 326 making an angle φ with the surface normal 318 of the curved major surface of the display, and an angle α (see FIG. 1) with an axis 333 parallel to a surface normal (e.g., corresponding to surface normal 116) in a central portion of the curved major surface 312 of the display panel 310.

In the embodiment illustrated in FIG. 3, the display panel 310 includes an emissive surface 309 and an additional element 341 disposed on the emissive surface 309. The additional element 341 includes the curved major surface 312 of the display panel 310. In some embodiments, the additional element 341 is or includes a touch sensor, for example. In some embodiments, the additional element 341 is or includes an adhesive layer, for example. In some embodiments, the additional element 341 is omitted. In some embodiments, an air gap separates the light control film 320 and the display panel 310. In the embodiment illustrated in FIG. 3, a louvered element 330 includes the light control film 320 and an additional element 340 disposed on the light control film 320 opposite the display panel 310. In some embodiments, the additional element 340 is or includes one or more of a touch sensor, an optical film, a glass layer, or a diffuser. In some embodiments, the additional element 340 is omitted.

The additional element 341 may alternatively be considered to be a layer of the louvered element 330 rather than an element of the display panel 310. In some embodiments, the additional element 340 and/or the additional element 341 may be considered to be portion(s) of the light control film 320.

The louvered element 330 has opposite first and second major surfaces 322 and 332. A light ray 329 emitted by the display panel 310 and transmitted through the optically transmissive region 323 along the central ray transmission direction 326 is refracted upon exiting the curved display into a direction 328 substantially parallel to the second axis 333. Within the additional element 340 adjacent the second major surface 332, the light ray 329 propagates along a direction 327 making an angle θ1 with a normal 334 to the second major surface 332. The light ray 329 is refracted upon exiting the curved display into direction 328 which makes an angle θ2 with the normal 334 to the second major surface 332. An angle β1 between the second axis 333 and the normal 334 to the second major surface 332 is illustrated. In some embodiments, the angle β1 is within 10 degrees, or within 5 degrees, of arcsin(n1 sin(φ)) where n1 is the refractive index of the optically transmissive region 323. In some embodiments, the normal 334 is parallel, or substantially parallel, to the normal 318 to the curved major surface 312 of the display panel 310 so that the angle β1 is, or is substantially equal to, an angle between the second axis 333 and the normal to the curved major surface 312. In some embodiments, a louvered element 330 disposed on the display panel 310 includes the light control film 320, the louvered element having opposite first and second major surfaces 322 and 332, the first major surface 322 facing and substantially conforming to the curved major surface 312 of the display panel 310, each optically transmissive region having a refractive index n1 greater than 1.2, where in the cross-section (x-y plane) orthogonal to the first axis and for each optically transmissive region, an angle β1 between the second axis 333 and a normal 334 to the second major surface is within 10 degrees, or within 5 degrees, of arcsin (n1 sin(φ)).

Figure 4:
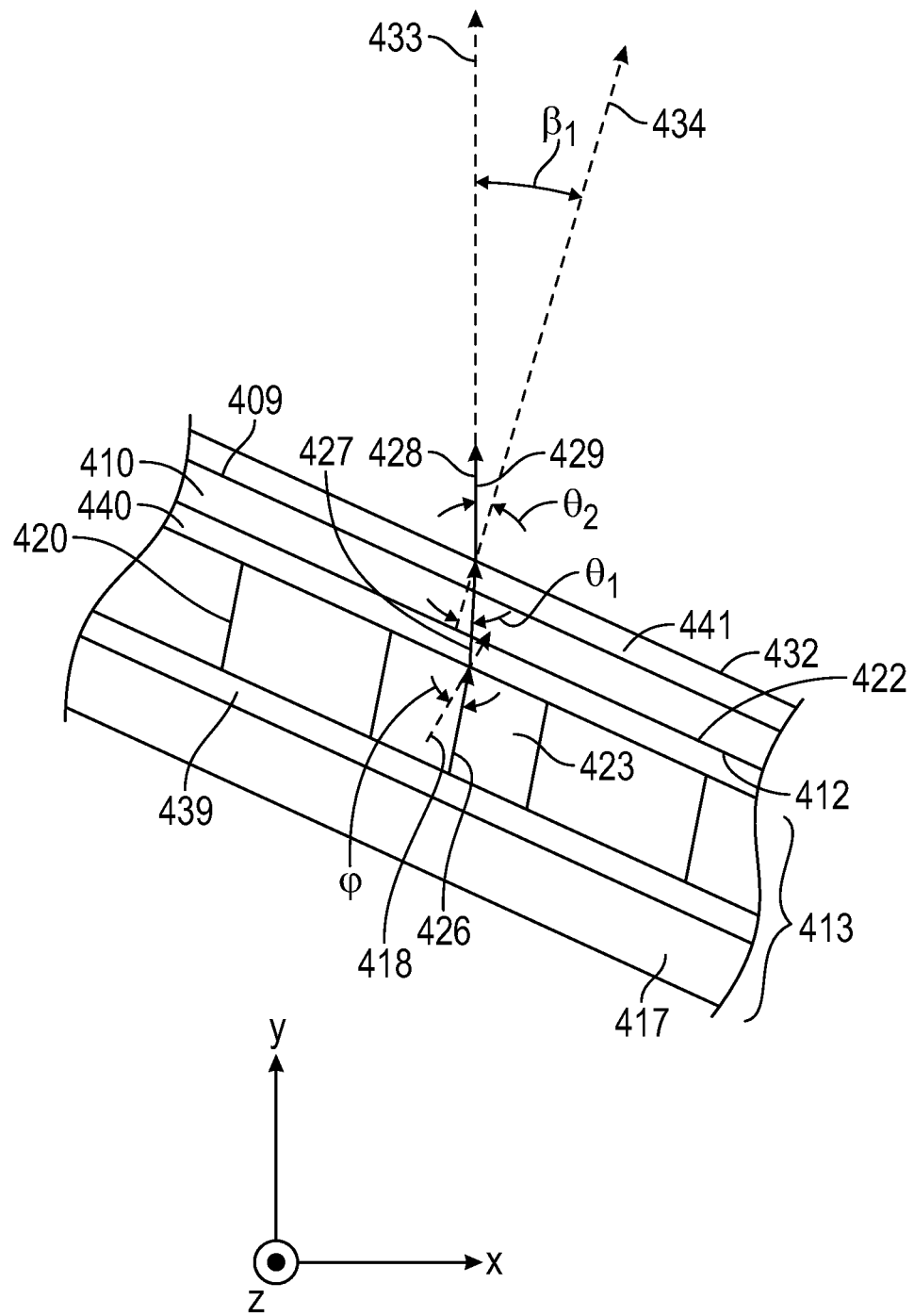

In other embodiments, the light control film is disposed on the light input side of a transmissive display. FIG. 4 is a schematic cross-sectional view of a portion of a curved display including a display panel 410 and a light control film 420 disposed proximate the display panel 410. The curvature of the display is not shown for the portion schematically illustrated in FIG. 4 since the radius of curvature is large compared to the size of the portion shown in this case. The display panel 410 and light control film 420 may be as described for display panel 210 and light control film 220, respectively, for example. The light control film 420 includes a plurality of alternating optically transmissive and optically absorptive regions as described elsewhere. In some embodiments, in a cross-section (x-y plane) orthogonal to the first axis, each optically transmissive region 423 and adjacent optically absorptive regions in the plurality of alternating optically transmissive and optically absorptive regions define a central ray transmission 426 direction making an angle φ with the surface normal 418 of the curved major surface of the display, and an angle α (see FIG. 2) with an axis 433 parallel to a surface normal in a central portion of the curved major surface of the display (e.g., corresponding to surface normal 216). The curved display includes a backlight 413 disposed to illuminate the display panel 410. The backlight 413 includes the light control film 420 and a backlighting element 417 disposed to illuminate the light control film 420.

The display panel 410 includes an emissive surface 409 and an additional element 441 disposed on the emissive surface 409 where the additional element 441 includes a curved major surface 432 of the display panel 410. The additional element 441 may be a touch sensor, for example. The light control film 420 includes additional elements 439 and 440 (alternatively, additional element 439 can be a portion of the backlighting element 417 and/or additional element 440 can be a portion of the display panel 410). The additional elements 439 and 440 may independently be selected to be or include one or more of a touch sensor, an optical film, a glass layer, an adhesive layer, or a diffuser. The additional elements 439, 440, and 441 are optional and any or all of these layers may be omitted in some embodiments. In some embodiments, an air gap separates the display panel 410 from the backlight 413. In the illustrated embodiment, the curved major surface 412 is a light input surface of the display panel 410 and the light control film 420 is disposed to transmit light to the light input surface. The light control film 420 has a first major surface 422 having a substantially same shape as the curved major surface 412 of the display panel 410.

In some embodiments, a light ray 429 emitted by the display panel 410 and transmitted through the optically transmissive region 423 along the central ray transmission direction 426 is refracted upon exiting the curved display into a direction 428 substantially parallel to the second axis 433. Within the display panel 410 adjacent the curved major surface 432, the light ray 429 propagates along a direction 427 making an angle θ1 with a normal 434 to the curved major surface 432. The light ray 429 is refracted upon exiting the curved display into direction 428 which makes an angle θ2 with the normal 434 to the curved major surface 432. An angle β1 between the second axis 433 and the normal 434 to the curved major surface 432 is illustrated. In some embodiments, the angle β1 is within 10 degrees, or within 5 degrees, of arcsin(n1 sin(φ)) where n1 is the refractive index of the optically transmissive region 423. In some embodiments, each optically transmissive region has a refractive index n1 greater than 1.2, and in the cross-section (x-y plane) orthogonal to the first axis and for each optically transmissive region, the angle β1 between the second axis 433 and a normal 434 to the curved major surface is within 10 degrees, or within 5 degrees, of arcsin(n1 sin(φ)).

In some embodiments, the angle φ increases from less than 5 degrees in a central region of the light control film 320 (resp., 420) to at least 10 degrees in an edge region of the light control film 320 (resp., 420). In some embodiments, the angle φ increases from less than 3 degrees in a central region of the light control film 320 (resp., 420) to at least 15 degrees, or to at least 20 degrees in an edge region of the light control film 320 (resp., 420). In some embodiments, the angle α increases from less than 5 degrees in a central region of the light control film 320 (resp., 420) to at least 10 degrees in an edge region of the light control film 320 (resp., 420). In some embodiments, the angle α increases from less than 3 degrees in a central region of the light control film 320 (resp., 420) to at least 15 degrees, or to at least 20 degrees in an edge region of the light control film 320 (resp., 420). In some embodiments, each of the angles φ and α increase from less than 5 degrees in a central region of the light control film 320 (resp., 420) to at least 10 degrees in an edge region of the light control film 320 (resp., 420). In some embodiments, each of the angles φ and α increase from less than 3 degrees in a central region of the light control film 320 (resp., 420) to at least 15 degrees, or to at least 20 degrees, in an edge region of the light control film 320 (resp., 420).

Figure 15A:
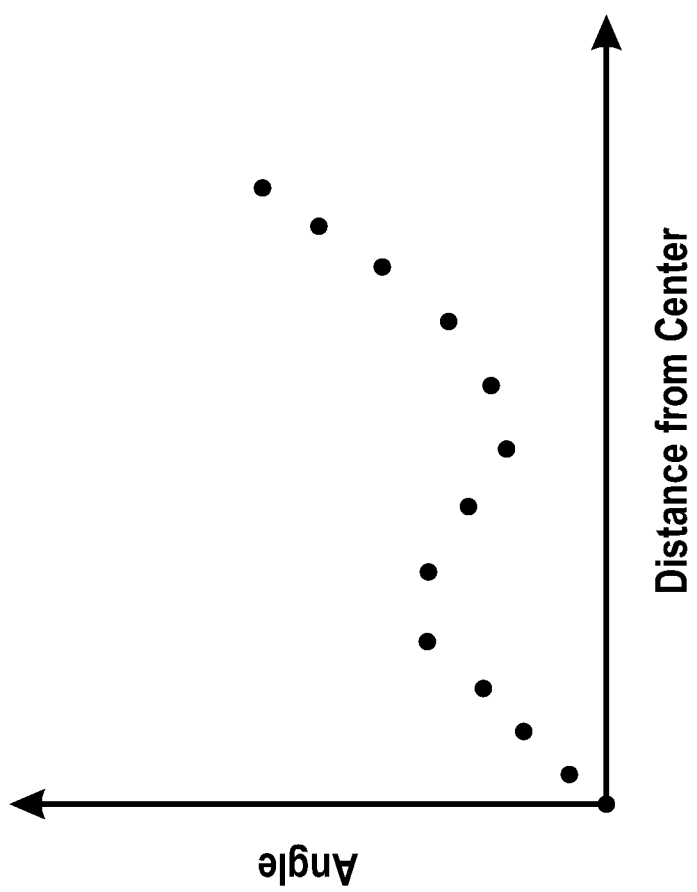
FIG. 15A is a schematic plot showing a continuous angle variation.
Figure 15B:
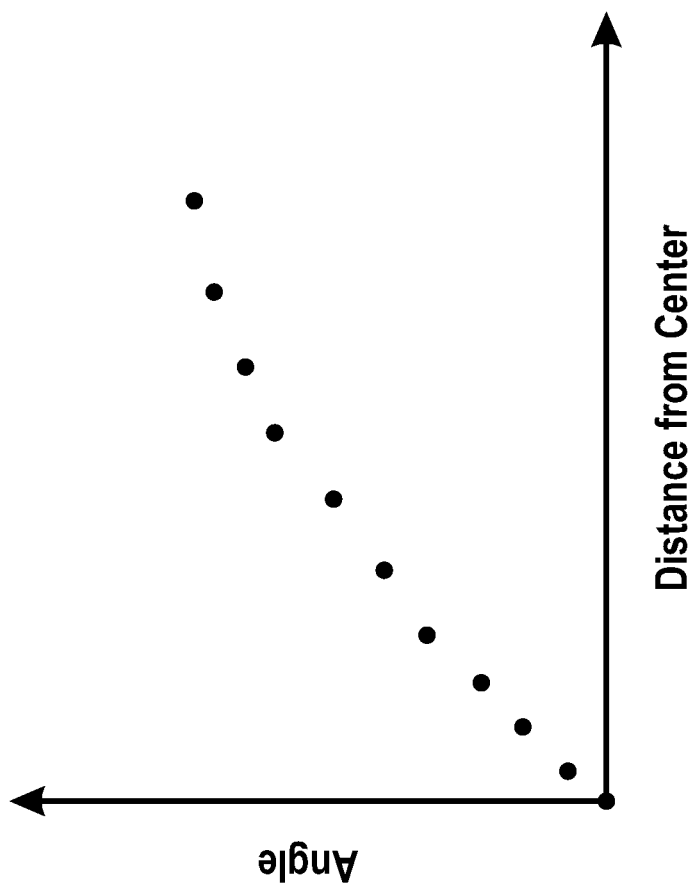
FIG. 15B is a schematic plot showing a monotonic angle variation.

The variation in the angle α and/or in the angle φ can be continuous (e.g., continuously varying from less than 5 degrees or less than 3 degrees in a central region of the light control film to at least 10 degrees or to at least 15 degrees in an edge region of the light control film). Examples of continuous variations of an angle (e.g., corresponding to α or φ) as a function of distance (e.g., along x-axis) from the center of light control films are schematically illustrated in FIGS. 15A-15B. The discrete points represent values of the angle for discrete optically transmissive regions. The variation is continuous when the discrete points generally follow (e.g., follow up to normal manufacturing variations) a continuous curve that has no rapid variations on a length scale of the spacing between the optically transmissive regions. The variation in the angle α and/or in the angle φ can be monotonic (monotonically increasing from less than 5 degrees or less than 3 degrees in a central region of the light control film to at least 10 degrees or to at least 15 degrees in an edge region of the light control film). An example of a monotonic variation of an angle (corresponding to α or φ) as a function of distance (e.g., along x-axis) from the center of a light control film is schematically illustrated in FIG. 15B. The variation is monotonic when the discrete points generally follow (e.g., follow up to normal manufacturing variations) a monotonic curve.

Figure 7A:
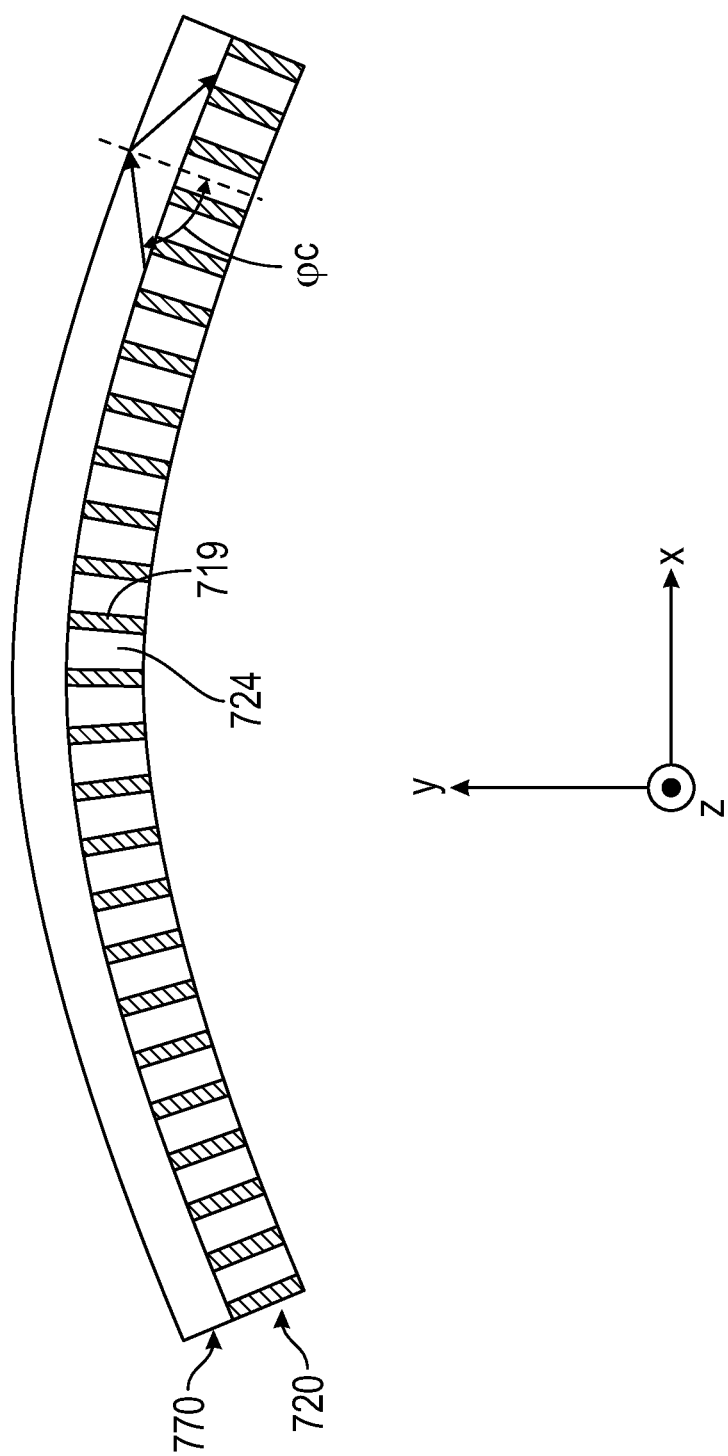
FIGS. 7A-7B are schematic cross-sectional views of a stack of light control films curved about two orthogonal axes.

In some preferred embodiments, for each optically transmissive region in the plurality of the plurality of alternating optically transmissive and optically absorptive regions, the angle φ is less than a critical angle φc for total internal reflection. Total internal reflection is typically most likely to occur at the outermost surface of the curved display where the light is refracted into air. In this case, the critical angle φc is the critical angle for total internal reflection at an interface of the curved display with air (measured relative to a normal to the outermost surface of the curved display). A critical angle φc for total internal reflection of light at an interface of a curved display with air is schematically illustrated in FIG. 7A.

Figure 5:
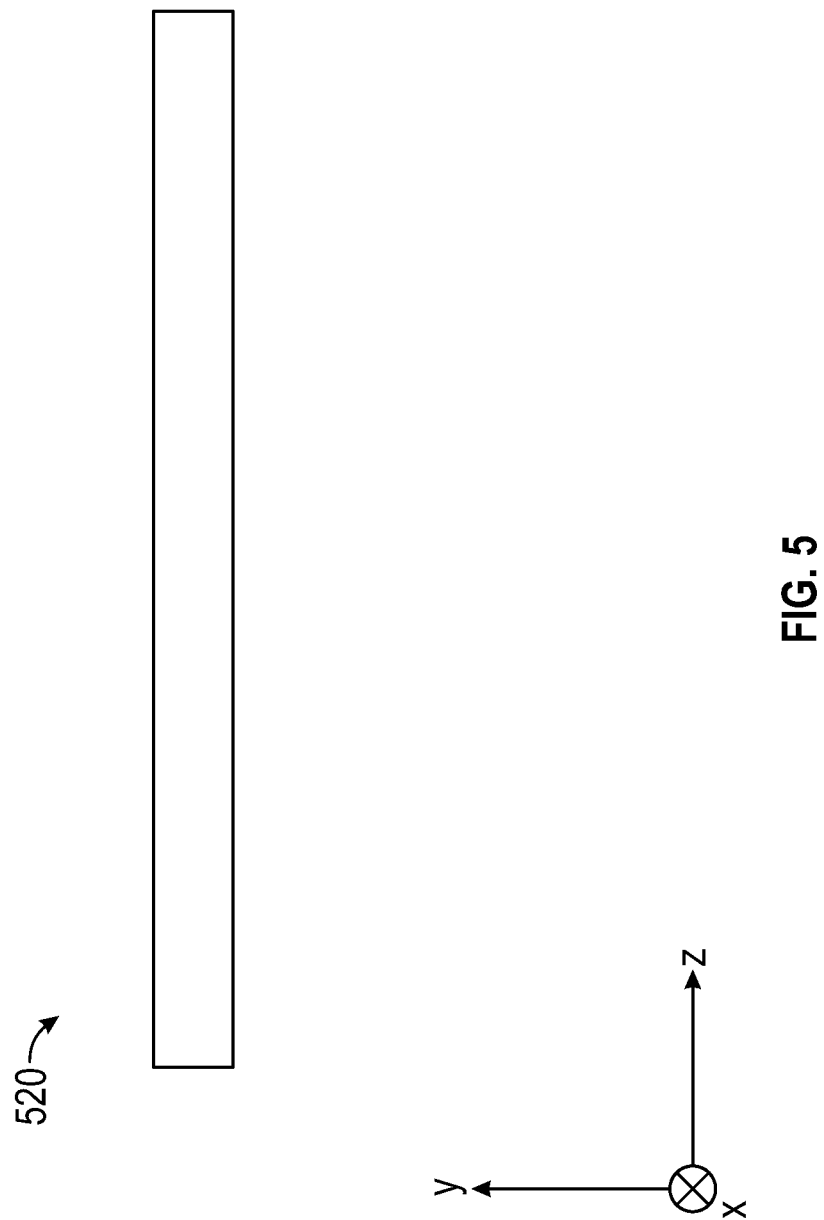
FIG. 5 is a schematic cross-sectional view of a light control film.

In some embodiments, the curved display is curved only along the first axis. For example, the curved displays 100 and 200 may be curved only about the z-axis and may be substantially flat or substantially planar in cross-sections containing the z-axis. Correspondingly, in some embodiments, the light control from is curved only along the first axis. FIG. 5 is a schematic cross-sectional view of a light control film 520 (e.g., corresponding to light control film 120 or 220) curved only about a first axis (z-axis). In some such embodiments or in other embodiments, the curved display further includes a second light control film that includes a second plurality of alternating optically transmissive and optically absorptive regions extending along a second longitudinal direction substantially orthogonal to the longitudinal direction. This is schematically illustrated in FIG. 6.

Figure 6:
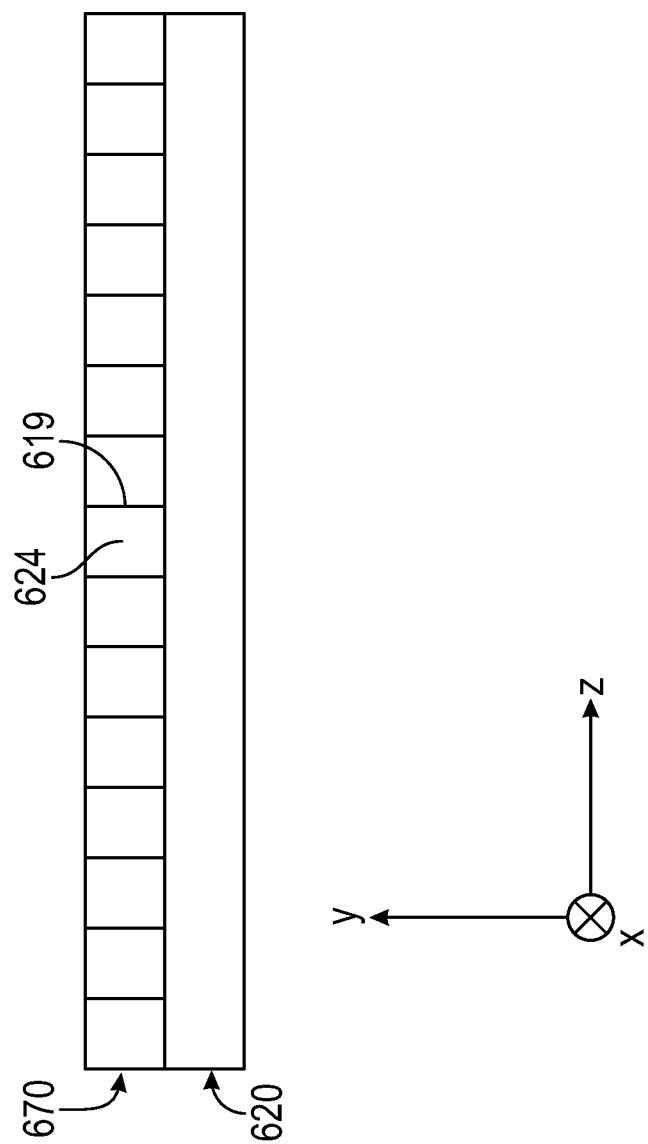
FIG. 6 is a schematic cross-sectional view of a stack of light control films.

FIG. 6 is a schematic cross-sectional view of a second light control film 670 disposed on a light control film 620 which may correspond to light control film 120, 220, or 520, for example. The second light control film 670 includes a plurality of alternating optically transmissive and optically absorptive regions 624 and 619 extending along a second longitudinal direction (a curvilinear direction parallel to the x-direction in the illustrated cross-section) substantially orthogonal to the longitudinal direction (z-direction) of the light control film 620. The second light control film 670 can have a central ray transmission direction normal to a major surface of the second light control film 670 (e.g., as in conventional light control films).

Figure 7B:
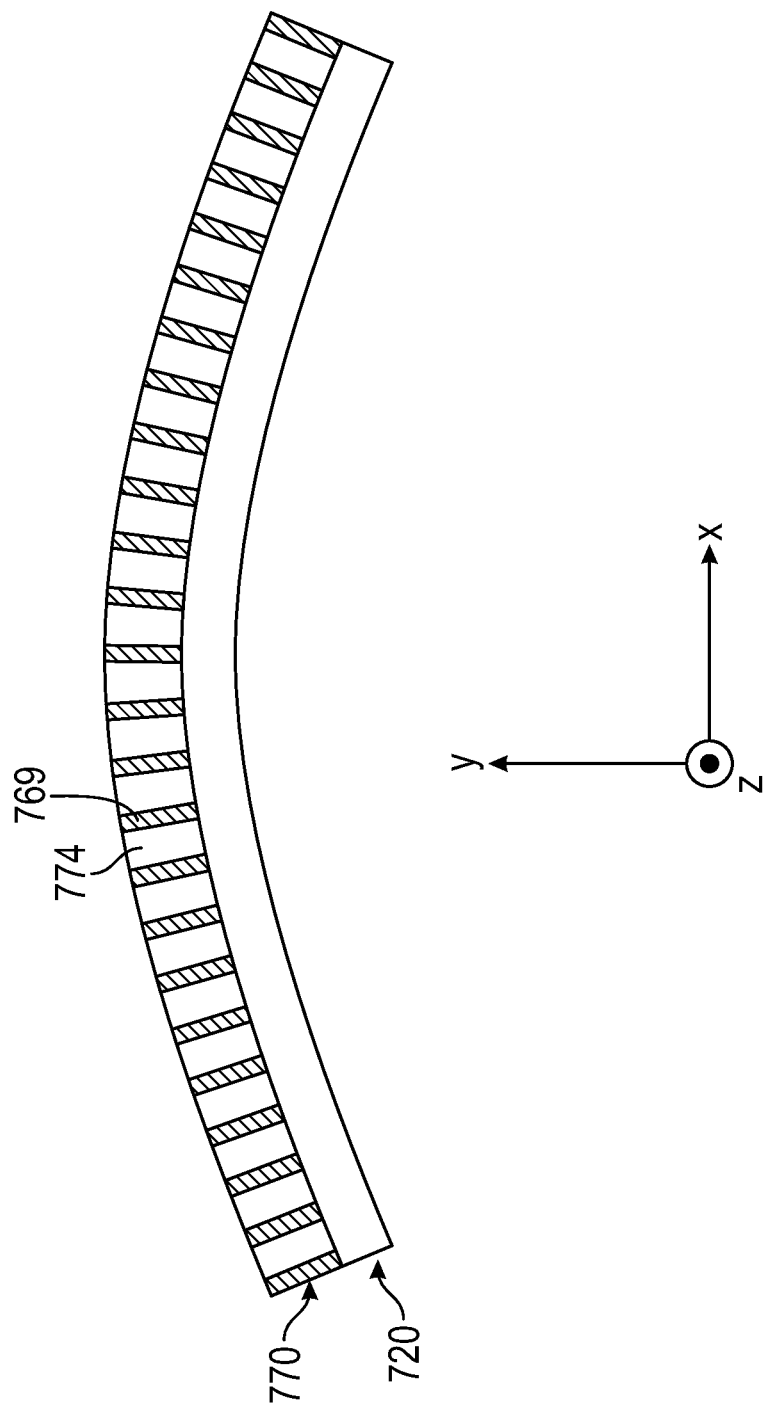

In some embodiments, the curved display is also curved along a third axis (e.g., x-axis) orthogonal to the first and second axes (e.g., z- and y-axes of FIGS. 1-2). In some such embodiments, the curved display includes a second light control film disposed on the light control film. This is schematically illustrated in FIGS. 7A-7B. The light control film 720 may correspond to light control film 120 or 220, for example. The second light control film 770 may be disposed on the light control film 720 opposite the display panel (e.g., between light control film 120 and additional element 140 in the embodiment illustrated in FIG. 1) or may be disposed between the light control film 720 and the display panel (e.g., between light control film 220 and the display panel 210 in the embodiment illustrated in FIG. 2). The light control film 720 includes alternating optically transmissive and optically absorptive regions 724 and 719 extending along a longitudinal direction (a curvilinear direction parallel to the z-direction in the cross-section of FIG. 7A) and the second light control film 770 includes a second plurality of alternating optically transmissive and optically absorptive regions 774 and 769 extending along a second longitudinal direction (a curvilinear direction parallel to the x-direction in the cross-section of FIG. 7B) substantially orthogonal to the longitudinal direction of the light control film 720. The second light control film 770 may have tilted louvers as described elsewhere. The light control film 720 and the second light control film 770 may have louvers with tilts of the louvers selected to have predetermined distributions such that the light output of the curved display has a desired distribution. For example, the desired light output distribution may be such that a central light ray passing through a transmissive region between adjacent louvers in each of the light control films is refracted upon exiting the curved display into a direction parallel to an axis normal to the display surface at a center of the display surface.

Figure 8:
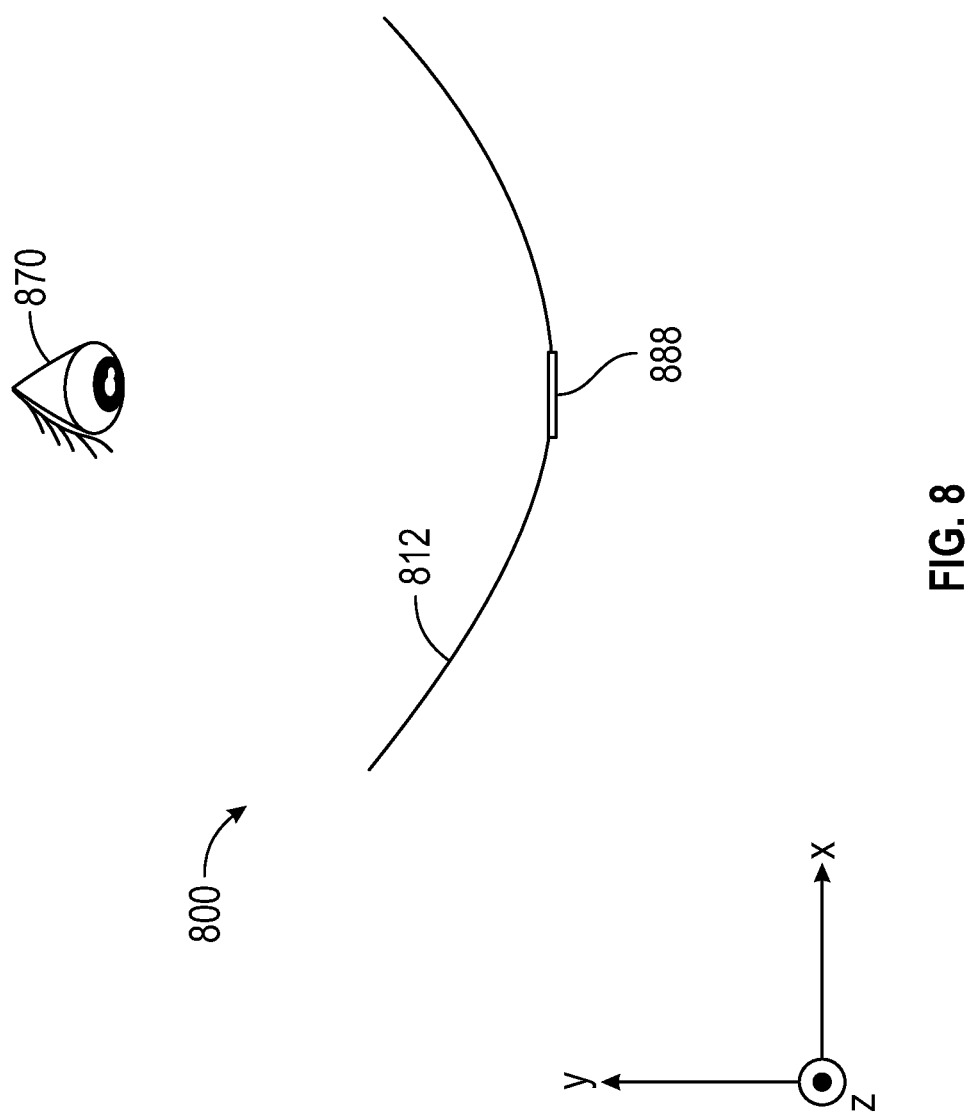
FIGS. 8-10 are schematic cross-sectional views of curved major surfaces having different shapes.
Figure 9:
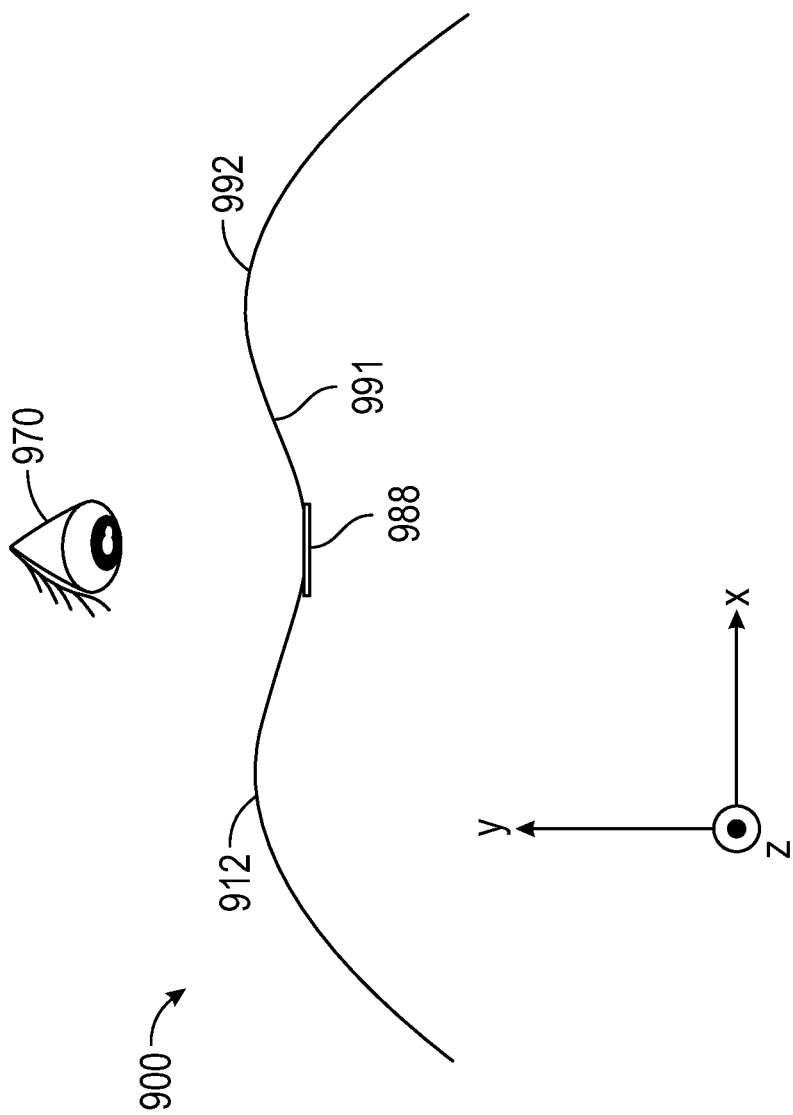

The display can be curved in either direction, or a combination of directions, toward or away from the viewer. In some embodiments, the curved display 100 is adapted to display an image 188 to a viewer 170, where in the cross-section orthogonal to the first axis (e.g., the x-y plane of FIG. 1 which is orthogonal to the axis), the curved major surface 112 is convex toward the viewer 170 along at least a majority of the curved major surface 112 (e.g., greater than 50%, or greater than 70/a, or greater than 80% of a total arc length of the curved major surface 112 in the cross-section). Similarly, in some embodiments, the curved display 200 is adapted to display an image 288 to a viewer 270, where in the cross-section orthogonal to the first axis (e.g., the x-y plane of FIG. 2 which is orthogonal to the axis), the curved major surface 212 is convex toward the viewer 270 along at least a majority of the curved major surface 212. In other embodiments, as schematically illustrated in FIG. 8, a curved display 800, which is curved about a first axis (z-axis) and which includes a display panel with a curved major surface 812, is adapted to display an image 888 to a viewer 870, where in a cross-section (x-y cross-section) orthogonal to the first axis, the curved major surface 812 is concave toward the viewer 870 along at least a majority of the curved major surface 812. In some embodiments, as schematically illustrated in FIG. 9, a curved display 900, which is curved about a first axis (z-axis) and which includes a display panel with a curved major surface 912, is adapted to display an image 988 to a viewer 970, where in a cross-section (x-y cross-section) orthogonal to the first axis, the curved major surface 912 is concave toward the viewer 970 along a first portion 991 of the curved major surface 912 and convex toward the viewer 970 along a different second portion 992 of the curved major surface 912.

Figure 10:
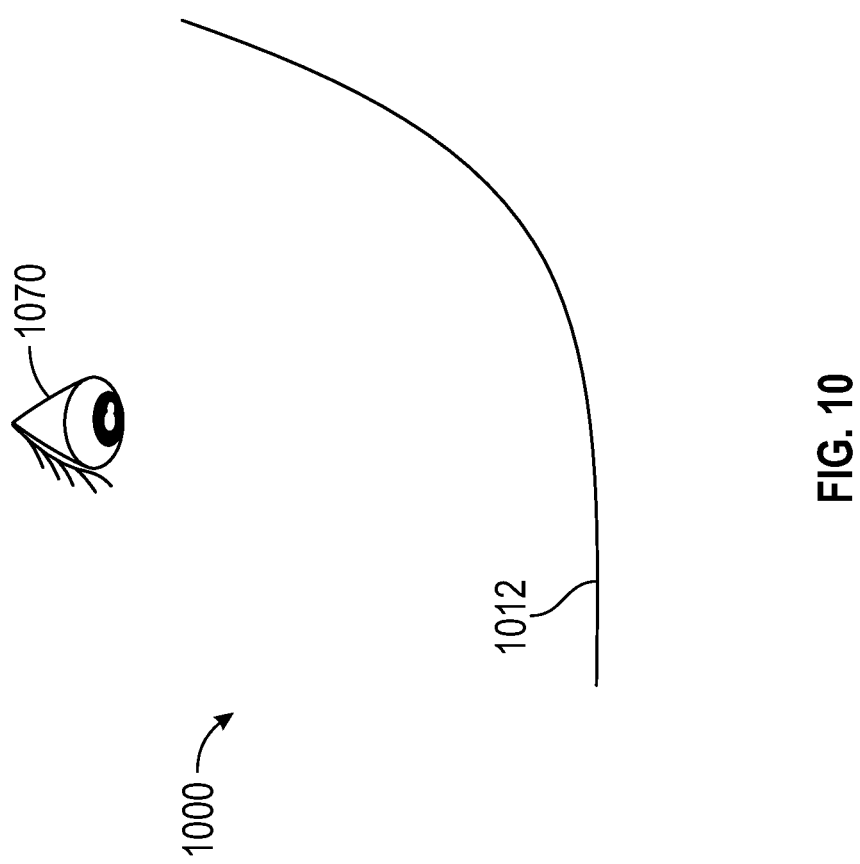

In some embodiments, the display has a non-symmetric orientation relative to a viewer. This is schematically illustrated in FIG. 10 which schematically shows a curved display 1000 having a display panel with a curved major surface 1012 which has a non-symmetric orientation relative to a viewer 1070 disposed at a preferred viewing location relative to the display 1000. The louvers of the light control film of the display 1000 may have a tilt distribution such that the central light rays propagating through the light control film are directed primarily toward the viewer 1070 upon exiting the curved display 1000.

In some embodiments, the optically absorptive regions are defined by louvers having a substantially constant thickness (e.g., as schematically illustrated in FIGS. 1-2). In other embodiments, the optically absorptive regions are defined by louvers having a tapered cross-section. Tapered louvers are schematically illustrated in FIG. 11, for example.

Figure 11:
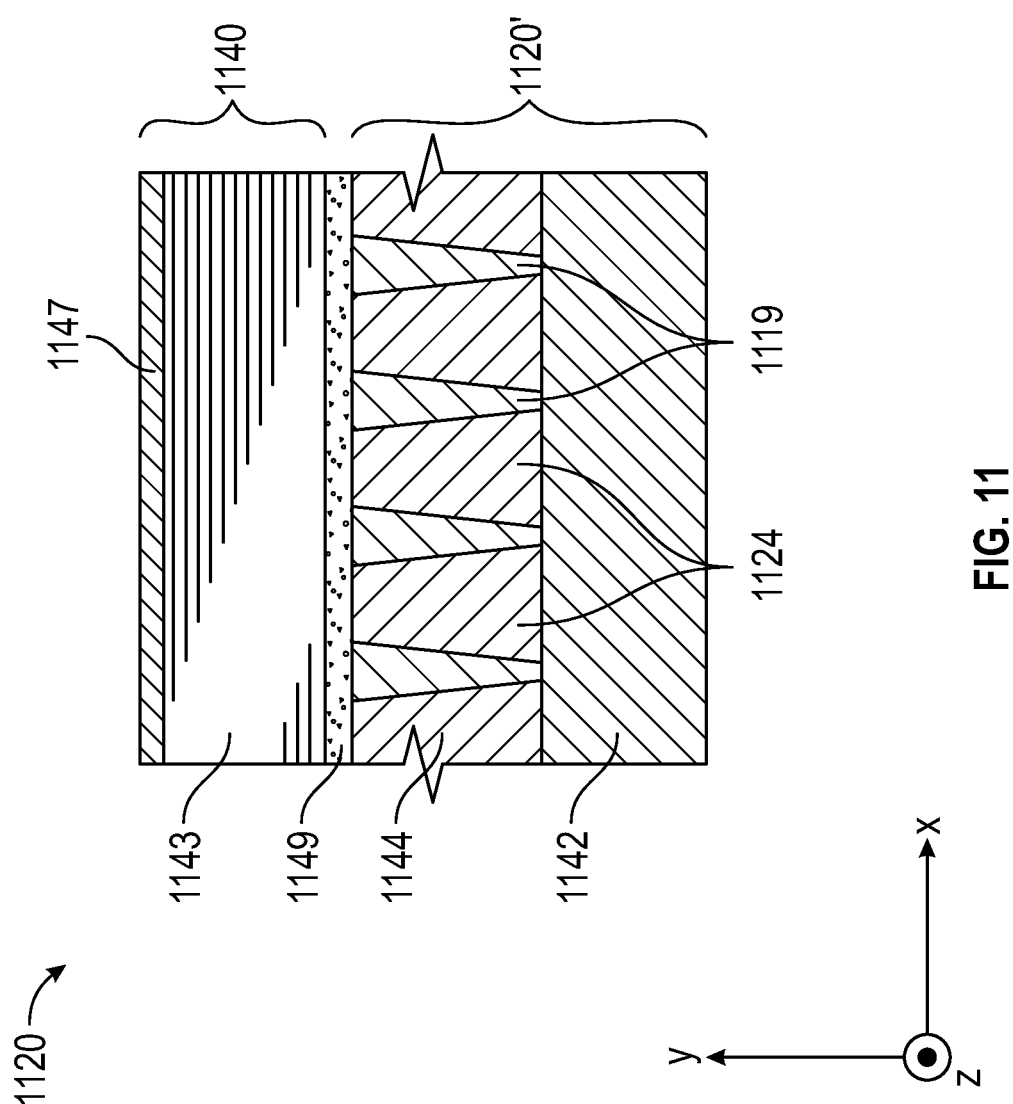
FIGS. 11-13 are schematic cross-sectional views of portions of light control films.

FIG. 11 is a schematic cross-sectional view of a portion of a light control film 1120, which may also be described as a louvered element, including a plurality of alternating optically transmissive and optically absorptive regions 1124 and 1119, respectively. The light control film 1120 includes a light control film 1120' and an additional element 1140 disposed on the light control film 1120'. In some embodiments, the additional element 1140 includes one or more of a touch sensor, an optical film (e.g., a multilayer optical film), a glass layer, or a diffuser. In the illustrated embodiment, the additional element 1140 includes a multilayer optical film 1143 and a diffuser 1147 disposed on the multilayer optical film 1143. The additional element 1140 is bonded to the light control film 1120' via adhesive layer 1149. In the illustrated embodiment, the light control film 1120' includes a louvered layer 1144 disposed on a base substrate 1142. The central ray transmission direction through the optically transmissive regions 1124 is substantially vertical (along the y-axis) in the illustrated portion of the light control film 1120. However, it will be understood that the central ray transmission direction varies across the light control film 1120 as described elsewhere herein. The additional element 1140 can be included to tailor the light output through the light control film as described in U.S. Pat. No. 8,503,122 (Liu et al.) and U.S. Pat. No. 8,659,829 (Walker, Jr. et al.), for example.

In some embodiments, the diffuser 1147 is primarily a volume diffuser (e.g., a beaded diffuser layer where most of the diffusion occurs in the bulk of the layer). In some embodiments, the diffuser 1147 is primarily a surface diffuser (e.g., a diffuser layer with a structured surface where most of the diffusion occurs at the surface. Suitable diffusers are described in U.S. Pat. No. 8,659,829 (Walker, Jr. et al.) and in U.S. Pat. Appl. Publ. No. 2012/0064296 (Walker, Jr. et al.), for example.

Figure 12:
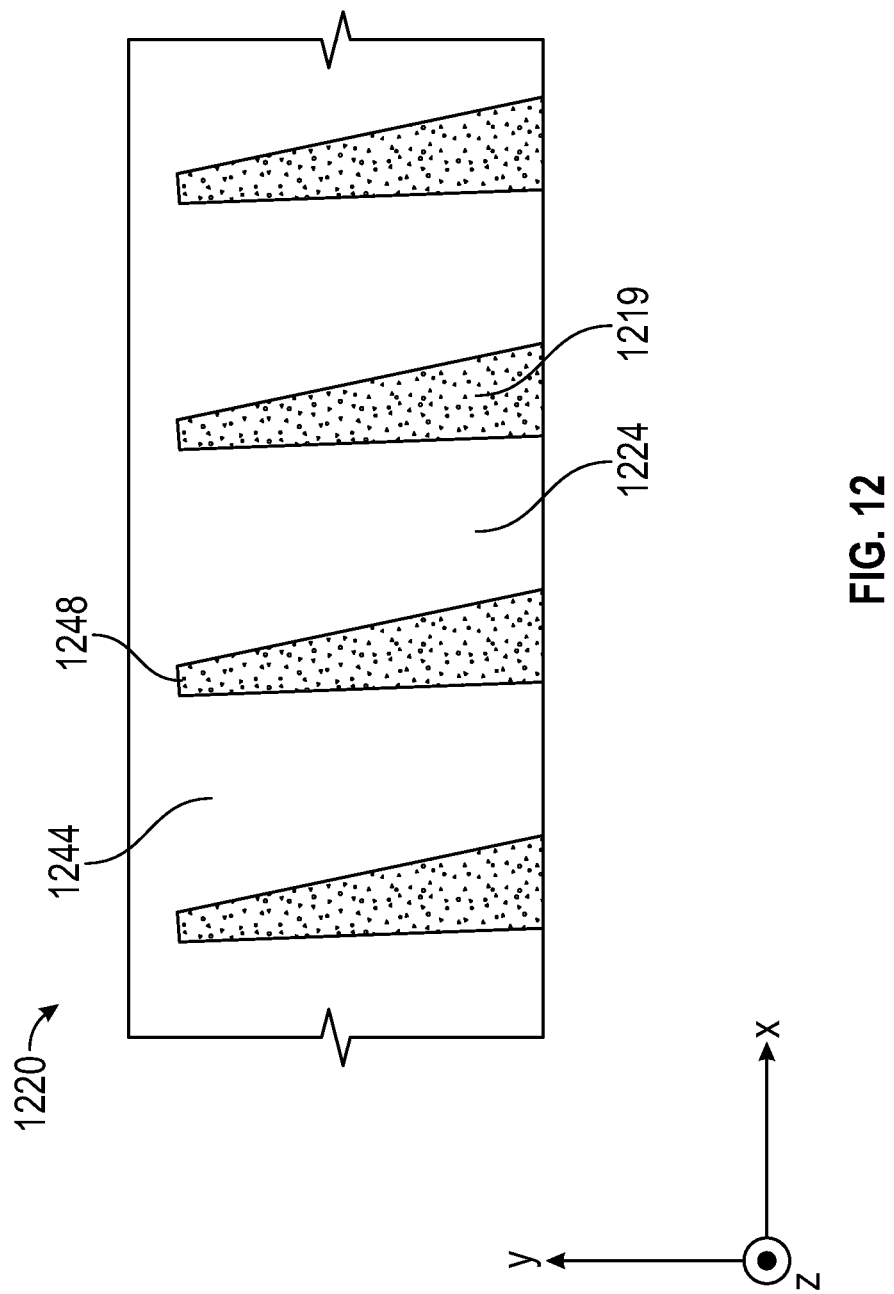

FIG. 12 is a schematic cross-sectional view of a portion of a light control film 1220 that includes a plurality of alternating optically transmissive regions 1224 and optically absorbing regions 1219 which may have a distribution of central ray transmission directions as described elsewhere herein. In some embodiments, a unitary film 1244 includes the optically transmissive regions 1224. Light control films including a unitary film that includes transmissive regions and grooves for absorptive regions are described in U.S. Pat. No. 8,213,082 (Gaides et al.), for example. In some embodiments, the absorptive regions 1219 include a plurality of particles 1248. The particles 1248 may be adapted to at least one of scatter or absorb light. In some embodiments, a combination of light scattering particles and optically absorptive dyes is used in the absorptive regions 1219. In some embodiments, the plurality of particles 1248 includes carbon black particles. In some embodiments, the carbon black particles have an average particles size (e.g., $D_{50}$) of less than 10 micrometers or less than 1 micrometer (e.g., between 5 nm or 10 nm and 10 micrometers or 1 micrometer).

Figure 13:
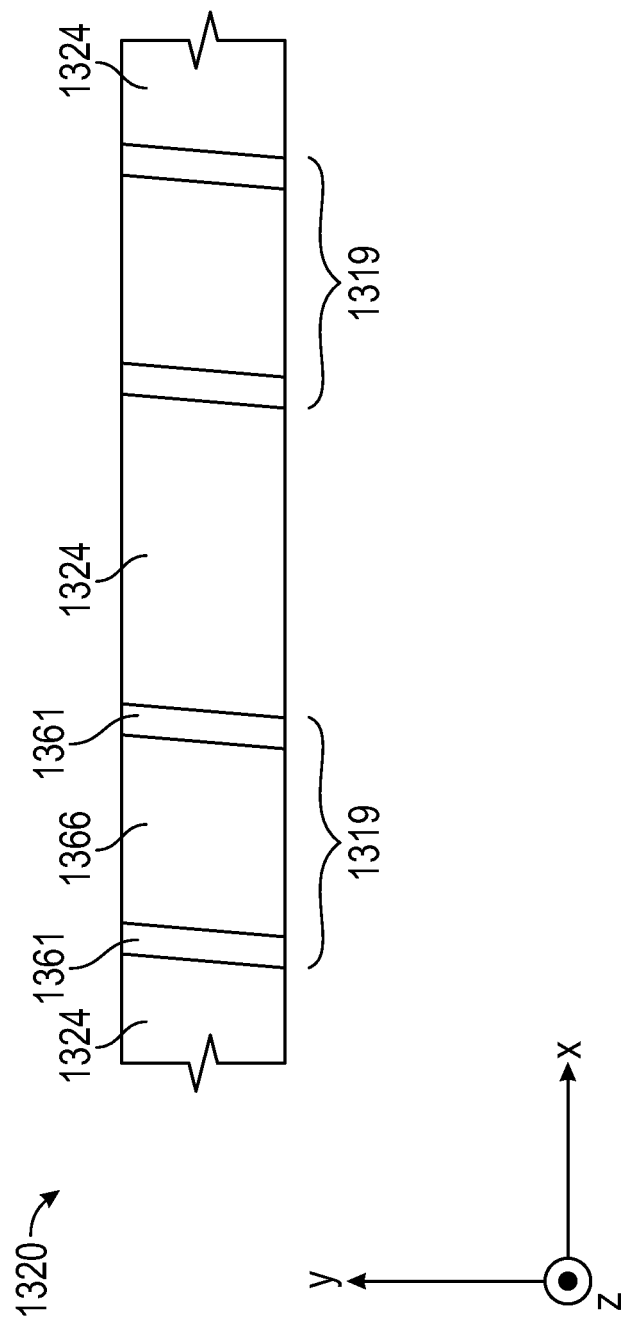

FIG. 13 is a schematic cross-sectional view of a portion of a light control film 1320 that includes a plurality of alternating optically transmissive regions 1324 and optically absorbing regions 1319 which may have a distribution of central ray transmission directions as described elsewhere herein. In some embodiments, each absorptive region 1319 includes a plurality of layers 1361, 1366. In some embodiments, the plurality of layers includes a central layer 1366 disposed between outer layers 1361, where the central layer has a higher coefficient of extinction than the outer layers (e.g., by a factor of at least 1.5). Such layered absorptive regions can be used to reduce ghosting as described in U.S. Pat. No. 5,254,388 (Melby et al.), for example.

The display panel of the curved display can be any suitable type of display panel. In some embodiments, the display panel is a micro-light emitting diode (micro-LED) display panel, an organic light emitting diode (OLED) display panel, a plasma display panel, a liquid crystal display (LCD) panel, or a static display panel. The curved display can be used in consumer electronics or automotive displays, for example. The curved display can be a handheld display (e.g., a smart phone display), a television display, a head-up display, or a sign display (e.g., a static sign for advertising), for example.

The light control film can be made by any suitable technique. Example techniques include skiving, laser ablation, photolithographic techniques, molding, and casting and curing or other microreplication techniques. For example, a light control film can be made by skiving the film from a multilayer stack of alternating optically transmissive and absorptive layers. As another example, grooves can be formed in a an optically transmissive film (e.g., by laser ablation or by casting and curing a resin against a tool) and the grooves can be subsequently filled with optically absorptive material. Methods of making light control films and related articles are described in U.S. Pat. No. 2,122,135 (Freeman), Re. 27,617 (Olsen), U.S. Pat. No. 8,213,082

(Gaides et al.), U.S. Pat. No. 8,503,122 (Liu et al.) and U.S. Pat. No. 8,659,829 (Walker, Jr. et al.), for example.

The desired tilt of the louvers (angle between the louvers and the display surface normal) can be determined as follows. A central ray transmission direction at a location on the light control film can be determined by reverse ray tracing from a desired output direction (e.g., along the y-direction). This central ray transmission direction can be calculated along the display surface and generally depends on the shape of the display surface and the refractive index of the optically transmissive regions. This allows the angle between the louvers (or the central ray transmission direction) and the display surface normal to be determined along the display surface. From this, the desired mold or tool geometry can be determined or the desired shape of a curve along which the light control film can be cut or skived from a multilayer stack can be determined. In some embodiments, the light control film is formed by skiving the film from a multilayer stack along a curve that is intermediate between a curved surface having the shape of a surface of a curved display and a tangent plane at a center of the curved surface.

Figure 14A:
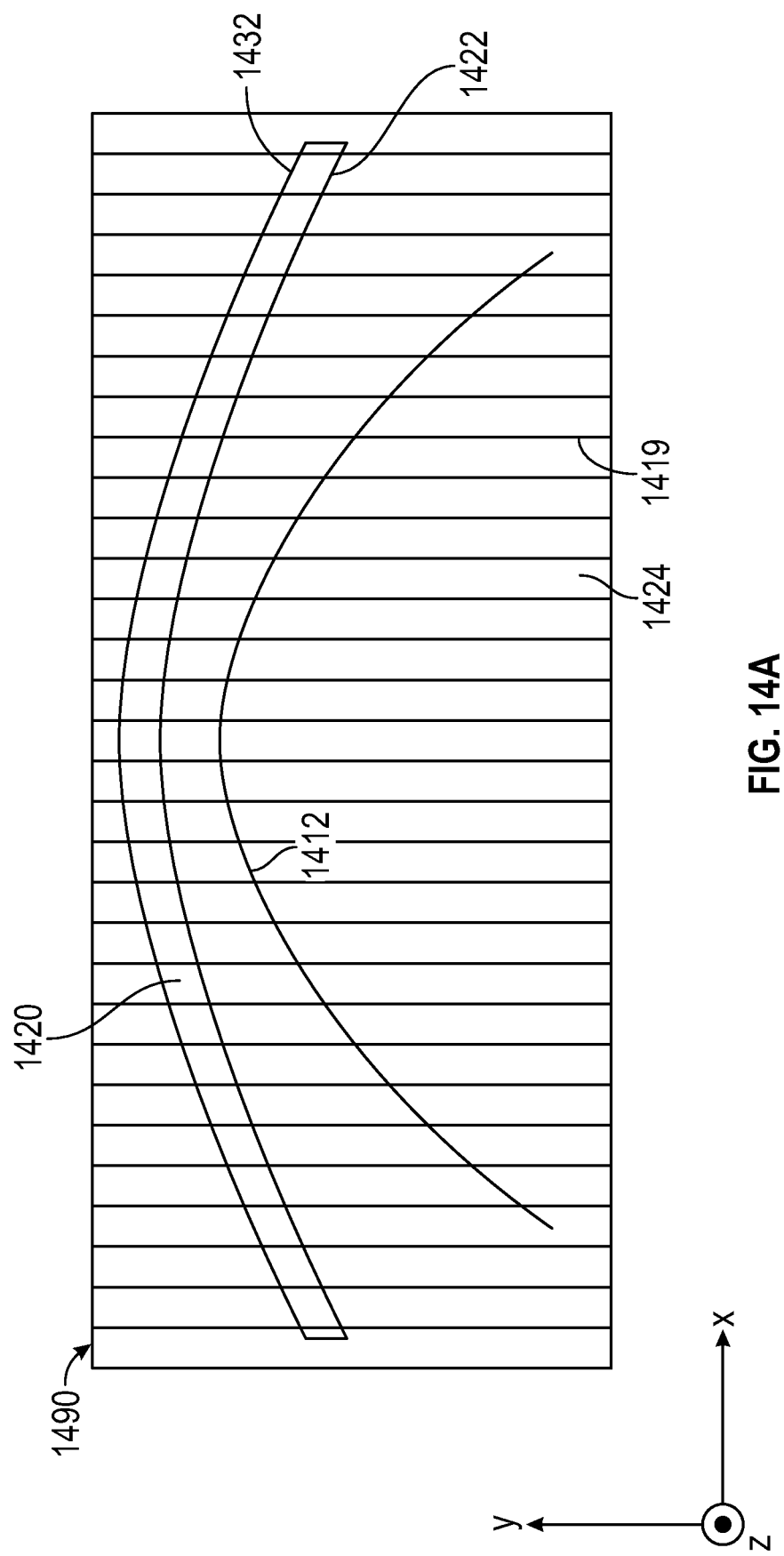
FIGS. 14A-14B schematically illustrate a method of making a light control film for a display panel having a curved major surface.
Figure 14B:
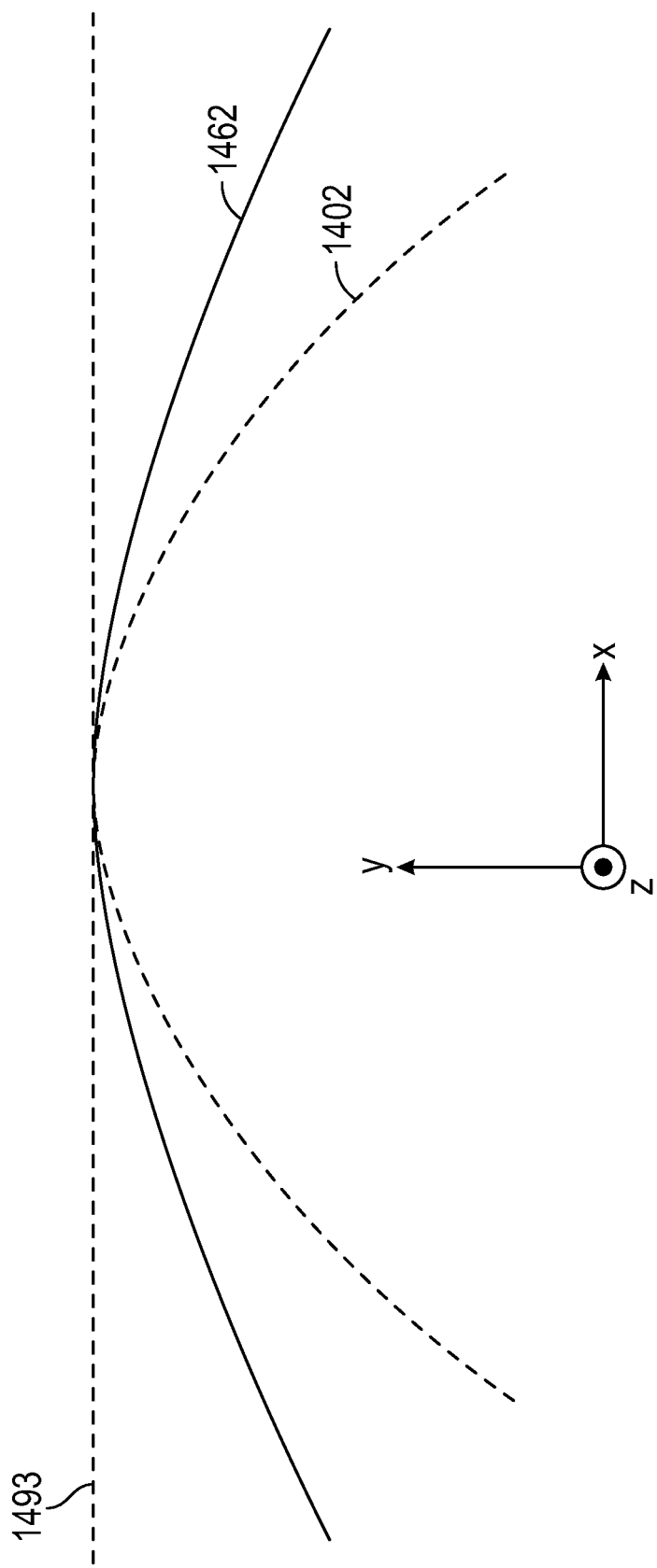

FIG. 14A is a schematic illustration of multilayer stack 1490 including alternating optically transmissive and optically absorbing layers 1424 and 1419. A light control film 1420 that can be cut from the multilayer stack is schematically illustrated and a curved major surface 1412 of a display panel is schematically shown superimposed on the multilayer stack. FIG. 14B is a schematic plot of a curved surface 1462, which corresponds to a major surface of the light control film, and first and second surfaces 1402 and 1493 where the first surface 1402 has the shape of the curved major surface 1412 of the display panel and the second surface 1493 is a plane tangent to the first surface 1402 at a center of the first surface 1402. In some embodiments, a method of making a light control film 1420 for a display panel having a curved major surface 1412 includes determining a shape of the curved major surface 1412 of the display panel; providing a multilayer stack 1490 including a plurality of alternating optically transmissive and optically absorptive layers 1424 and 1419; cuttin7g the light control film 1420 from the multilayer stack 1490 along at least opposing major curved surfaces 1422, 1432 of the light control film 1420. For each of the curved surfaces 1422, 1432, at least a majority of the curved surface (greater than 50% of a total area of the curved surface) is intermediate between first and second surfaces 1402 and 1493, the first surface 1402 having the shape of the curved major surface 1412 of the display panel, the second surface 1493 being a plane tangent to the first surface 1402 (e.g., at a center of the first surface 1402). Cutting the light control film 1420 from the multilayer stack 1490 may include cutting beyond the major surfaces of the light control film 1420 to edges of the multilayer stack 1490 and/or may also include cutting along the minor side surfaces of the light control film 1420. Alternatively, a width (e.g., in the x-direction of FIG. 14A) of the multilayer stack 1490 may be selected such that the minor side surfaces of the light control film 1420 coincides with portions of side surfaces of the multilayer stack 1490.

In FIG. 14B, the curved surface 1462 may correspond to either of the curved surfaces 1422 or 1432. The first and second surfaces for the curved surface 1422 may differ from the first and second surfaces for the curved surface 1432 only by translation along the y-axis (axis normal to the second surface). At least a majority of the curved surface 1462 is intermediate between the first surface 1402 and the second surface 1493 since the curved surface 1462 is between the first and second surfaces 1402 and 1493 without following either of the first and second surfaces 1402 and 1493 except near the center of the first surface 1402. In some embodiments, at least 80 percent or at least 90 percent by area of the curved surface 1462 is intermediate between the first surface 1402 and the second surface 1493. In some embodiments, the method further includes increasing a bend in the light control film 1420 such that the light control film 1420 generally conforms to the curved major surface 1412 of the display panel to provide the curved display.

Determining the shape of the curved surface 1412 of the display panel can be carried out by measuring the shape or by receiving specifications or data on the shape from the manufacturer of the display panel, for example. The multilayer stack can be provided by extruding the stack, by forming the stack through other processing means known in the art, or by purchasing the stack from a supplier, for example.

The following is a list of illustrative embodiments of the present description.

A first embodiment is a curved display comprising:
   a display panel comprising a curved major surface, the curved major surface being curved about a first axis, a central portion of the curved major surface having a surface normal along a second axis substantially orthogonal to the first axis; and
   a light control film disposed proximate the display panel and comprising a first major surface having a substantially same shape as the curved major surface of the display panel, the light control film comprising a plurality of alternating optically transmissive and optically absorptive regions extending along a longitudinal direction parallel to the first axis and arranged along a direction orthogonal to the first and second axes such that the plurality of alternating optically transmissive and optically absorptive regions is substantially coextensive with the first major surface, the optically transmissive regions having a refractive index greater than 1.2, wherein in a cross-section orthogonal to the first axis and for each optically transmissive region in at least a majority of the optically transmissive regions in the plurality of alternating optically transmissive and optically absorptive regions, the optically transmissive region and adjacent optically absorptive regions define a central ray transmission direction through the optically transmissive region such that a light ray emitted by the display panel and transmitted through the optically transmissive region along the central ray transmission direction is refracted upon exiting the curved display into a direction substantially parallel to the second axis.

A second embodiment is the curved display of the first embodiment, wherein the curved major surface is a light output surface of the display panel, the light control film being disposed to receive light from the light output surface.

A third embodiment is the curved display of the first embodiment, wherein the curved major surface is a light input surface of the display panel, the light control film being disposed to transmit light to the light input surface.

A fourth embodiment is the curved display of the first or third embodiments, further comprising a backlight disposed to illuminate the display panel, the backlight comprising the light control film.

A fifth embodiment is the curved display of any one of the first through fourth embodiments, wherein in the cross-section orthogonal to the first axis, the central ray transmission direction makes an angle with a normal to the curved major surface, the angle continuously varying from less than 5 degrees in a central region of the light control film to at least 10 degrees in an edge region of the light control film.

A sixth embodiment is the curved display of any one of the first through fifth embodiments, wherein in the cross-section orthogonal to the first axis, the central ray transmission direction makes an angle with a normal to the curved major surface, the angle monotonically increasing from less than 3 degrees in a central region of the light control film to at least 15 degrees in an edge region of the light control film.

A seventh embodiment is the curved display of any one of the first through sixth embodiments being adapted to display an image to a viewer, wherein in the cross-section orthogonal to the first axis, the curved major surface is concave toward the viewer along at least a majority of the curved major surface.

An eighth embodiment is the curved display of any one of the first through sixth embodiments being adapted to display an image to a viewer, wherein in the cross-section orthogonal to the first axis, the curved major surface is convex toward the viewer along at least a majority of the curved major surface.

A ninth embodiment is the curved display of any one of the first through eighth embodiments, further comprising an additional element disposed on the light control film opposite the display panel.

A tenth embodiment is the curved display of the ninth embodiment, wherein the additional element comprises one or more of a touch sensor, an optical film, a glass layer, or a diffuser.

An eleventh embodiment is a curved display comprising:
  a display panel comprising a curved major surface, the curved major surface being curved about a first axis and having a surface normal being along a second axis substantially orthogonal to the first axis in a central portion of the curved major surface and making an angle γ of at least 15 degrees with the second axis in an edge portion of the curved major surface; and
  a light control film disposed proximate the display panel and comprising a first major surface having a substantially same shape as the curved major surface of the display panel, the light control film comprising a plurality of alternating optically transmissive and optically absorptive regions extending along a longitudinal direction parallel to the first axis and arranged along a direction orthogonal to the first and second axes, wherein in a cross-section orthogonal to the first axis, each optically transmissive region and adjacent optically absorptive regions in the plurality of alternating optically transmissive and optically absorptive regions define a central ray transmission direction making an angle φ with the surface normal of the curved major surface and an angle α with the second axis, each of the angles φ and α increasing from less than 5 degrees in a central region of the light control film to at least 10 degrees in an edge region of the light control film.

A twelfth embodiment is the curved display of the eleventh embodiment, wherein the angle φ increases monotonically from less than 3 degrees in the central region of the light control film to at least 15 degrees in the edge region of the light control film.

A thirteenth embodiment is the curved display of the eleventh or twelfth embodiments, wherein the first major surface of the light control film is disposed on, and conforms to, the curved major surface of the display panel.

A fourteenth embodiment is the curved display of any one of the eleventh to thirteenth embodiments, wherein the light control film is configured such that for each optically transmissive region and adjacent optically absorptive regions in the plurality of alternating optically transmissive and optically absorptive regions, a light ray transmitted from the display panel through the optically transmissive region along the central ray transmission direction is refracted upon exiting the curved display into a direction substantially parallel to the second axis.

A fifteenth embodiment is a method of making a light control film for a display panel having a curved major surface, the method comprising:
  determining a shape of the curved major surface of the display panel;
  providing a multilayer stack comprising a plurality of alternating optically transmissive and optically absorptive layers; and
  cutting the light control film from the multilayer stack along at least opposing major curved surfaces of the light control film, wherein for each of the curved surfaces, at least a majority of the curved surface is intermediate between first and second surfaces, the first surface having the shape of the curved major surface of the display panel, the second surface being a plane tangent to the first surface.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A curved display comprising:
  a display panel comprising a curved major surface, the curved major surface being curved about a first axis, a central portion of the curved major surface having a surface normal along a second axis substantially orthogonal to the first axis; and
  a light control film disposed proximate the display panel and comprising a first major surface having a substantially same shape as the curved major surface of the display panel, the light control film comprising a plurality of alternating optically transmissive and optically absorptive regions extending along a longitudinal direction parallel to the first axis and arranged along a direction orthogonal to the first and second axes such that the plurality of alternating optically transmissive and optically absorptive regions is substantially coextensive with the first major surface, the optically transmissive regions having a refractive index greater than 1.2, wherein in a cross-section orthogonal to the first axis and for each optically transmissive region in at least a majority of the optically transmissive regions in the plurality of alternating optically transmissive and optically absorptive regions, the optically transmissive region and adjacent optically absorptive regions define a central ray transmission direction through the opti- cally transmissive region such that a light ray emitted by the display panel and transmitted through the optically transmissive region along the central ray transmission direction is refracted upon exiting the curved display into a direction substantially parallel to the second axis, wherein in the cross-section orthogonal to the first axis, the central ray transmission direction makes an angle with a normal to the curved major surface, the angle continuously varying from less than 5 degrees in a central region of the light control film to at least 10 degrees in an edge region of the light control film.

2. The curved display of claim 1, wherein the curved major surface is a light output surface of the display panel, the light control film being disposed to receive light from the light output surface.

3. The curved display of claim 1, wherein the curved major surface is a light input surface of the display panel, the light control film being disposed to transmit light to the light input surface.

4. The curved display of claim 1, further comprising a backlight disposed to illuminate the display panel, the backlight comprising the light control film.

5. The curved display of claim 1, wherein the angle continuously varies from less than 3 degrees in the central region of the light control film to at least 15 degrees in the edge region of the light control film.

6. The curved display of claim 1, wherein the angle monotonically increases from less than 3 degrees in the central region of the light control film to at least 15 degrees in the edge region of the light control film.

7. The curved display of claim 1 being adapted to display an image to a viewer, wherein in the cross-section orthogonal to the first axis, the curved major surface is concave toward the viewer along at least a majority of the curved major surface.

8. The curved display of claim 1 being adapted to display an image to a viewer, wherein in the cross-section orthogonal to the first axis, the curved major surface is convex toward the viewer along at least a majority of the curved major surface.

9. The curved display of claim 1, further comprising an additional element disposed on the light control film opposite the display panel.

10. The curved display of claim 9, wherein the additional element comprises one or more of a touch sensor, an optical film, a glass layer, or a diffuser.

11. A curved display comprising:
a display panel comprising a curved major surface, the curved major surface being curved about a first axis and having a surface normal being along a second axis substantially orthogonal to the first axis in a central portion of the curved major surface and making an angle $\gamma$ of at least 15 degrees with the second axis in an edge portion of the curved major surface; and
a light control film disposed proximate the display panel and comprising a first major surface having a substantially same shape as the curved major surface of the display panel, the light control film comprising a plurality of alternating optically transmissive and optically absorptive regions extending along a longitudinal direction parallel to the first axis and arranged along a direction orthogonal to the first and second axes, wherein in a cross-section orthogonal to the first axis, each optically transmissive region and adjacent optically absorptive regions in the plurality of alternating optically transmissive and optically absorptive regions define a central ray transmission direction making an angle $\phi$ with the surface normal of the curved major surface and an angle $\alpha$ with the second axis, each of the angles o and a increasing from less than 5 degrees in a central region of the light control film to at least 10 degrees in an edge region of the light control film.

12. The curved display of claim 11, wherein the angle $\phi$ increases monotonically from less than 3 degrees in the central region of the light control film to at least 15 degrees in the edge region of the light control film.

13. The curved display of claim 11, wherein the first major surface of the light control film is disposed on, and conforms to, the curved major surface of the display panel.

14. The curved display of claim 11, wherein the light control film is configured such that for each optically transmissive region and adjacent optically absorptive regions in the plurality of alternating optically transmissive and optically absorptive regions, a light ray transmitted from the display panel through the optically transmissive region along the central ray transmission direction is refracted upon exiting the curved display into a direction substantially parallel to the second axis.

15. A method of making a light control film for a display panel having a curved major surface, the method comprising:
determining a shape of the curved major surface of the display panel;
providing a multilayer stack comprising a plurality of alternating optically transmissive and optically absorptive layers; and
cutting the light control film from the multilayer stack along at least opposing major curved surfaces of the light control film, wherein for each of the curved surfaces, at least a majority of the curved surface is intermediate between first and second surfaces, the first surface having the shape of the curved major surface of the display panel, the second surface being a plane tangent to the first surface.

* * * * *